United States Patent
Arvidson et al.

(10) Patent No.: US 10,443,160 B2
(45) Date of Patent: Oct. 15, 2019

(54) BREATHABLE LIGHT WEIGHT UNIDIRECTIONAL LAMINATES

(71) Applicant: HONEYWELL INTERNATIONAL INC., Morris Plains, NJ (US)

(72) Inventors: Brian Duane Arvidson, Chester, VA (US); Henry Gerard Ardiff, Chesterfield, VA (US); Ashok Bhatnagar, Richmond, VA (US); Tamara L. Ehle, Midlothian, VA (US); Shari E. Litow, Midlothian, VA (US); Brian Waring, Chester, VA (US); Mark Benjamin Boone, Mechanicsville, VA (US); Thomas Tam, Chesterfield, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/621,077

(22) Filed: Jun. 13, 2017

(65) Prior Publication Data

US 2017/0275790 A1 Sep. 28, 2017

Related U.S. Application Data

(60) Continuation-in-part of application No. 14/996,391, filed on Jan. 15, 2016, now Pat. No. 9,994,977, which is a division of application No. 13/835,489, filed on Mar. 15, 2013, now Pat. No. 9,243,355.

(51) Int. Cl.
*D03D 1/00* (2006.01)
*D03D 15/00* (2006.01)
(Continued)

(52) U.S. Cl.
CPC ............. *D03D 1/0052* (2013.01); *B32B 3/30* (2013.01); *B32B 5/022* (2013.01); *B32B 5/024* (2013.01);
(Continued)

(58) Field of Classification Search
CPC .................................................... D03D 1/0052
(Continued)

(56) References Cited

U.S. PATENT DOCUMENTS

| 4,144,368 A | 3/1979 | Kim et al. |
| 4,159,360 A | 6/1979 | Kim |

(Continued)

FOREIGN PATENT DOCUMENTS

| EP | 0747518 | 12/1996 | |
| EP | 0747518 A1 * | 12/1996 | ............. D03D 15/00 |

(Continued)

OTHER PUBLICATIONS

"Salomon S Lab X Alp Midlayer Hoodie Review," It's All About the Vertical, https://itsallaboutthevertical.wordpress.com/2015/12/16/salomonslabxalpmidlayerhoodiereview (Dec. 16, 2015).
(Continued)

*Primary Examiner* — Brent T O'Hern
(74) *Attorney, Agent, or Firm* — Roberts & Roberts, LLP; Richard S. Roberts, Jr.

(57) ABSTRACT

Lightweight, breathable, non-woven fibrous materials and composite articles incorporating the same are provided. Composite articles are formed by merging an open, non-woven grid formed from high tenacity elongate bodies with at least one substrate, forming an article having excellent tensile strength, excellent breathability and a unique aesthetic appearance.

19 Claims, 12 Drawing Sheets

(51) Int. Cl.
  *D06C 7/00* (2006.01)
  *B32B 5/02* (2006.01)
  *B32B 5/18* (2006.01)
  *B32B 5/24* (2006.01)
  *B32B 5/26* (2006.01)
  *B32B 7/04* (2019.01)
  *B32B 7/14* (2006.01)
  *B32B 9/02* (2006.01)
  *B32B 9/04* (2006.01)
  *B32B 27/12* (2006.01)
  *B32B 27/28* (2006.01)
  *B32B 27/36* (2006.01)
  *B32B 27/40* (2006.01)
  *B32B 3/30* (2006.01)

(52) U.S. Cl.
  CPC .............. *B32B 5/026* (2013.01); *B32B 5/028* (2013.01); *B32B 5/18* (2013.01); *B32B 5/245* (2013.01); *B32B 5/26* (2013.01); *B32B 7/04* (2013.01); *B32B 7/14* (2013.01); *B32B 9/025* (2013.01); *B32B 9/047* (2013.01); *B32B 27/12* (2013.01); *B32B 27/285* (2013.01); *B32B 27/36* (2013.01); *B32B 27/40* (2013.01); *D03D 15/0027* (2013.01); *D03D 15/0088* (2013.01); *D06C 7/00* (2013.01); *B32B 2255/02* (2013.01); *B32B 2255/26* (2013.01); *B32B 2260/021* (2013.01); *B32B 2260/046* (2013.01); *B32B 2262/02* (2013.01); *B32B 2262/0223* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/062* (2013.01); *B32B 2262/101* (2013.01); *B32B 2262/106* (2013.01); *B32B 2262/14* (2013.01); *B32B 2266/025* (2013.01); *B32B 2266/0278* (2013.01); *B32B 2307/402* (2013.01); *B32B 2307/41* (2013.01); *B32B 2307/412* (2013.01); *B32B 2307/414* (2013.01); *B32B 2307/54* (2013.01); *B32B 2307/554* (2013.01); *B32B 2307/5825* (2013.01); *B32B 2307/712* (2013.01); *B32B 2307/724* (2013.01); *B32B 2307/7265* (2013.01); *B32B 2307/73* (2013.01); *B32B 2307/732* (2013.01); *B32B 2437/00* (2013.01); *B32B 2437/02* (2013.01); *D10B 2401/041* (2013.01); *Y10T 428/24124* (2015.01); *Y10T 442/30* (2015.04); *Y10T 442/3146* (2015.04)

(58) Field of Classification Search
  USPC ........................................................ 428/113
  See application file for complete search history.

(56) References Cited

U.S. PATENT DOCUMENTS

| | | | |
|---|---|---|---|
| 4,188,445 A | 2/1980 | Hill | |
| 4,275,105 A | 6/1981 | Boyd et al. | |
| 4,348,444 A | 9/1982 | Craig | |
| 4,457,985 A | 7/1984 | Harpell et al. | |
| 4,680,213 A | 7/1987 | Fourezon | |
| 4,704,172 A | 11/1987 | Katz | |
| 4,748,064 A | 5/1988 | Harpell et al. | |
| 4,892,780 A | 1/1990 | Cochran et al. | |
| 5,102,725 A | 4/1992 | Knox et al. | |
| 5,192,601 A | 3/1993 | Neisler | |
| 5,333,568 A | 8/1994 | Meldner et al. | |
| 5,403,641 A | 4/1995 | Linville et al. | |
| 5,724,670 A | 3/1998 | Price | |
| 5,753,343 A | 5/1998 | Braun et al. | |
| 5,804,015 A | 9/1998 | McCarter et al. | |
| 5,893,191 A | 4/1999 | Schneider et al. | |
| 6,071,834 A | 6/2000 | Martz | |
| 6,074,505 A | 6/2000 | Ouellette et al. | |
| 6,280,546 B1 | 8/2001 | Holland et al. | |
| 6,432,236 B1 | 8/2002 | Leemon et al. | |
| 6,565,944 B1 | 5/2003 | Hartness et al. | |
| 6,610,618 B1 | 8/2003 | Bottger et al. | |
| 6,632,150 B1 | 10/2003 | Ogg | |
| 6,863,959 B2 | 5/2005 | Welch et al. | |
| 6,989,125 B2 | 1/2006 | Boney et al. | |
| 7,135,226 B1 | 11/2006 | Nagamoto | |
| 7,211,291 B2 * | 5/2007 | Harpell ................. | B29C 70/504 427/180 |
| 7,514,378 B2 | 4/2009 | Howland | |
| 7,910,503 B2 | 3/2011 | Krueger et al. | |
| 7,964,261 B2 | 6/2011 | Backer et al. | |
| 7,964,266 B2 | 6/2011 | Harding et al. | |
| 7,964,518 B1 | 6/2011 | Bhatnagar et al. | |
| 7,993,715 B2 | 8/2011 | Geva et al. | |
| 8,168,022 B2 | 5/2012 | Backer et al. | |
| 8,349,112 B2 | 1/2013 | Backer et al. | |
| 8,784,968 B2 | 7/2014 | Adams et al. | |
| 9,243,354 B2 | 1/2016 | Tam et al. | |
| 9,243,355 B2 | 1/2016 | Tam et al. | |
| 9,334,662 B2 | 5/2016 | Spanton et al. | |
| 9,358,755 B2 | 6/2016 | Adams et al. | |
| 9,610,756 B2 | 4/2017 | Ashton | |
| 2002/0034624 A1 | 3/2002 | Harpell et al. | |
| 2002/0164912 A1 | 11/2002 | Fawcett et al. | |
| 2003/0008583 A1 | 1/2003 | Chiou | |
| 2003/0022578 A1 | 1/2003 | Lubker | |
| 2004/0010212 A1 | 1/2004 | Kuiper et al. | |
| 2005/0090170 A1 | 4/2005 | Jackson | |
| 2006/0035078 A1 | 2/2006 | Tam et al. | |
| 2006/0252325 A1 | 11/2006 | Matsumura et al. | |
| 2008/0116043 A1 | 5/2008 | Chahal et al. | |
| 2008/0295950 A1 | 12/2008 | Mack et al. | |
| 2009/0042471 A1 | 2/2009 | Cashin et al. | |
| 2009/0311930 A1 | 12/2009 | Wang et al. | |
| 2010/0124862 A1 | 5/2010 | Smith | |
| 2010/0168704 A1 | 7/2010 | Thomas et al. | |
| 2010/0275764 A1 | 11/2010 | Egres | |
| 2010/0316838 A1 | 12/2010 | Krummel | |
| 2010/0317248 A1 | 12/2010 | Chang et al. | |
| 2011/0097021 A1 | 4/2011 | Curran et al. | |
| 2011/0174147 A1 | 7/2011 | Steeman et al. | |
| 2011/0256341 A1 | 10/2011 | Geva et al. | |
| 2011/0269359 A1 | 11/2011 | Tam et al. | |
| 2012/0085224 A1 | 4/2012 | Jongedijk et al. | |
| 2012/0128947 A1 | 5/2012 | Bohringer | |
| 2012/0189805 A1 | 7/2012 | Backer et al. | |
| 2014/0273696 A1 | 9/2014 | Tam et al. | |
| 2015/0208762 A1 | 7/2015 | Reinhardt et al. | |
| 2015/0210034 A1 | 7/2015 | Tarrier et al. | |
| 2015/0282544 A1 | 10/2015 | Lankes et al. | |
| 2016/0339671 A1 | 11/2016 | Adams et al. | |
| 2017/0080678 A1 | 3/2017 | Bhatnagar et al. | |

FOREIGN PATENT DOCUMENTS

| | | |
|---|---|---|
| JP | 2004149929 | 5/2004 |
| WO | 9208615 | 5/1992 |
| WO | 2006045256 | 5/2006 |
| WO | 2009141276 | 11/2009 |
| WO | 2013076794 | 5/2013 |

OTHER PUBLICATIONS

"Rab Viper Jacket," Blister, http://web.archive.org/web/20140327181509/http://blistergearreview.com/gearreviews/rabviperjacket (Mar. 27, 2014).

"Italian Black Netting Fused to a Birch Jersey," Mood, moodfabrics.com, product#: 313623, http://www.moodfabrics.com/fashionfabrics/otherfabrics/netting/italianblacknettingfusedtoabirchjersey313623.html (accessed: Nov. 2016).

(56) References Cited

OTHER PUBLICATIONS

South Korean Design Reg. No. 30-0247021 (1999).
Shimek, et al. "Effects of weave type on the ballistic performance of fabrics." AIAA Journal, v 50, n 11, p. 2558-2565, Nov. 2012; ISSN: 00011452; DOI: 10.2514/1.J051708; American Institute of Aeronautics and Astronautics Inc.
Phoenix et al. "New Interference Approach for Ballistic Impact into Stacked Flexible Composite Body Armor." AIAA Journal, v 48, n 2, p. 490-501, Feb. 2010; ISSN: 00011452; DOI: 10.2514/1.45362; American Institute of Aeronautics and Astronautics Inc.
Lee et a.l "Failure of Spectraqq* polyethylene fiber-reinforced composites under ballistic impact loading." Journal of Composite Materials, v 28, n 13, p. 1202-1226, 1994; ISSN: 00219983; Technomic Publ Co Inc.
Chen et al., "Ballistic Resistance Analysis of High Strength Fibers With Different Combination," Chung Cheng Institute of Technology; vol. 37, No. 2, p. 33-42 (English translation pp. 1-18); May 2009; Taiwan.
International Search Report for PCT/US2018/036651.

* cited by examiner

BREATHABLE LIGHT WEIGHT UNIDIRECTIONAL LAMINATES

CROSS-REFERENCE TO RELATED APPLICATIONS

This application is a Continuation-in-Part of application Ser. No. 14/996,391, filed Jan. 15, 2016, now U.S. Pat. No. 9,994,977, which is a Division of application Ser. No. 13/835,489, filed Mar. 15, 2013, now U.S. Pat. No. 9,243,355, the entire disclosures of which are incorporated by reference herein.

BACKGROUND

Technical Field

This technology relates to lightweight, breathable, non-woven fibrous materials and composite articles incorporating the same.

Description of the Related Art

High performance fibrous composites formed from high strength fibers are well known in various industries. High strength fibers conventionally used include polyolefin fibers, such as extended chain polyethylene fibers, and aramid fibers, such as para- and meta-aramid fibers. For many applications, the fibers may be used in a woven or knitted fabric, while for other applications the fibers may be formed into non-woven fabrics. No matter the industry, there is a constant desire for fabrics that are lighter weight while still strong and resistant to degradation and damage. In the armor industry, the most desirable fibrous composite articles are those having the greatest ballistic resistance possible at the lightest weight possible, while other optional features such as abrasion resistance or environmental resistance are typically of secondary importance. In non-armor industries, such as textile industries that fabricate wearable textile articles such as sports apparel and footwear, as well as non-wearable textile articles such as tents, properties such as environmental resistance and breathability are equally as important as high strength and light weight.

In this regard, it is desirable for fibrous composites that are designed to have good environmental resistance to be breathable so that water vapor can pass through the fabric while blocking passage of liquids, as well as to prevent condensation, user perspiration, etc., from building up on or underneath the fabric. Conventionally, environmentally resistant non-armor textile products have been fabricated as multilayer structures incorporating woven fabrics as reinforcing components members, particularly fabrics woven from very low denier fibers (i.e., 1 denier or less) having relatively low tenacities (i.e., 10 g/denier or less), or non-woven felted fabrics, which felted fabric are formed from randomly laid fibers and have a degree of porosity that allows vapors to pass therethrough while blocking liquids. Each of these types of breathable structures has disadvantages. Breathable woven fabrics, for example, do not utilize the full tensile strength of the fibers due to the inherent crimping of fibers due to the weaving process. Such fiber crimp also reduces the ability of the system to stay in tension, which is particularly problematic when high strength is of primary importance. See, for example, U.S. Pat. No. 8,193,105 which teaches a breathable waterproof fabric formed to resist allergen transmission. The fabrics are woven from low tenacity polyester or natural fibers to achieve a porous, breathable structure having a pore size of less than one micron. U.S. Pat. No. 7,682,994 teaches a woven fabric that is permeable to water vapor and impermeable to liquid water. The fabric comprises a combination of low tenacity hydrophobic fibers and low tenacity hydrophilic wicking yarns. Similarly, breathable felted fabrics are unable to utilize the full tensile strength of the fibers due to the randomized orientation of the fibers. In this regard, greatest strength of a fiber is along its longitudinal axis, and therefore the physical strength of a felted fabric varies depending on the direction of an applied load. See, for example, U.S. Pat. No. 8,328,968 which teaches a microporous composite sheet material comprising spun bonded, randomly disposed polyester fibers that are bonded together to form a porous, non-woven felt. This material is breathable but suffers from inadequate tensile strength.

It is therefore recognized that to maximize the strength of reinforced breathable materials, reinforcing elements that are straight and not crimped should be utilized. One such approach is disclosed in U.S. pre-grant publication 2015/0282544 which teaches multilayered, breathable, waterproof textile materials. Fibers in a first non-woven layer form an angle of approximately 90° with respect to the fibers in a second non-woven layer. Each fiber of each fabric layer is embedded within a matrix material and the layers are compacted such that the fibers in each layer are laterally married to each other. In some embodiments, this matrix material is a non-hydrophilic material that is applied in sufficiently thin concentrations to allow gaps to form between the fibers, which gaps are then filled with a hydrophilic material. In other embodiments, the matrix material is a hydrophilic material that fully fills any spaces between adjacent fibers. The fabric layers are then laminated between an outer hydrophobic polymer layer and a polyurethane inner membrane. While these composite materials are described as having good breathability, their utility is limited by the need to have adjacent fibers laterally married with each other for proper structural stability (as is described in their commonly-owned U.S. Pat. No. 5,333,568 which is incorporated by reference into their disclosure), which results in significantly greater fiber content and fabric weight relative to a composite that does not require such lateral marriage of fibers. Another approach is disclosed in U.S. Pat. No. 8,784,968 which teaches waterproof breathable materials that are reinforced with non-woven fabrics wherein areas between the fibers are either free from a gas permeability blocking polymer or contain a permeable W/B adhesive or film which allows gas breathability while preventing or inhibiting the flow of fluids. As described therein, all of the fibers in their materials are enclosed by an adhesive that forms a cover over each individual fiber, forming these elongate bodies into a conventionally known "core-sheath" structure. As shown in their FIGS. 1-3, 5 and 6, such a cover (i.e., the sheath) substantially increases the size and volume occupied by the fiber (i.e., the core) within the composite, as well as increases the distance between adjacent fibers, both laterally adjacent as well as between overlying-underlying fibers within adjacent planes in a multi-layer stack. This type of structure has limited utility because the resin content is greater than the actual content of the high strength fibers, which limits the physical strength of the resulting composite articles and makes the composite more susceptible to degradation during use. Accordingly, there remains a need in the art for textile articles having superior physical strength, light weight and breathability, which may also be produced with improved efficiency and at a lower cost. The present disclosure provides a solution to this need.

SUMMARY OF THE DISCLOSURE

It has been unexpectedly discovered that low weight, breathable fabric structures may be created by incorporating an open, non-woven fabric that is fabricated from high tenacity, high denier fibers and/or fibrous tapes. The load carrying capability of the open, non-woven fabric element may be customized to varying needs by manipulating fiber/tape denier and gap dimensions within the structure while also maintaining composite breathability and enabling the composites to be utilized under virtually any environmental conditions. The open, non-woven fabric may be laminated to various substrates such as fabrics, felts, foams, films, membranes, etc., or combinations thereof, depending on the desired end use.

Particularly, the disclosure provides an open, non-woven fabric comprising:
a) a first array comprising a plurality of laterally spaced first elongate bodies, wherein immediately laterally adjacent first elongate bodies are spaced apart from each other at their nearest longitudinal edges whereby an empty space is between said immediately laterally adjacent first elongate bodies; wherein each of said first elongate bodies comprises at least one filament and optionally comprises a binder coating, said binder coating comprising less than 50% by weight of each of said first elongate bodies;
b) a second array comprising a plurality of laterally spaced second elongate bodies, wherein immediately laterally adjacent second elongate bodies are spaced apart from each other at their nearest longitudinal edges whereby an empty space is between said immediately laterally adjacent second elongate bodies; wherein each of said second elongate bodies comprises at least one filament and optionally comprises a binder coating, said binder coating comprising less than 50% by weight of each of said second elongate bodies;
wherein the first array overlies the second array and wherein the first elongate bodies are oriented at an angle relative to the second elongate bodies, whereby gaps are defined at the junctions of pairs of overlying, adjacent first elongate bodies and pairs of underlying, adjacent second elongate bodies;
wherein each of the first elongate bodies overlies and is bonded to a plurality of the second elongate bodies, and wherein each of the second elongate bodies underlies and is bonded to a plurality of the first elongate bodies, whereby the first elongate bodies and the second elongate bodies are bonded to each other at their junctions.

Further provided is a composite comprising an open, non-woven fabric attached to at least one substrate, said open, non-woven fabric comprising:
a) a first array comprising a plurality of laterally spaced first elongate bodies, wherein immediately laterally adjacent first elongate bodies are spaced apart from each other at their nearest longitudinal edges whereby an empty space is between said immediately laterally adjacent first elongate bodies; wherein each of said first elongate bodies comprises at least one filament and optionally comprises a binder coating, said binder coating comprising less than 50% by weight of each of said first elongate bodies;
b) a second array comprising a plurality of laterally spaced second elongate bodies, wherein immediately laterally adjacent second elongate bodies are spaced apart from each other at their nearest longitudinal edges whereby an empty space is between said immediately laterally adjacent second elongate bodies; wherein each of said second elongate bodies comprises at least one filament and optionally comprises a binder coating, said binder coating comprising less than 50% by weight of each of said second elongate bodies;
wherein the first array overlies the second array and wherein the first elongate bodies are oriented at an angle relative to the second elongate bodies, whereby gaps are defined at the junctions of pairs of overlying, adjacent first elongate bodies and pairs of underlying, adjacent second elongate bodies;
wherein each of the first elongate bodies overlies and is bonded to a plurality of the second elongate bodies, and wherein each of the second elongate bodies underlies and is bonded to a plurality of the first elongate bodies, whereby the first elongate bodies and the second elongate bodies are bonded to each other at their junctions;
wherein said substrate comprises a woven fabric, a closed non-woven fabrics, a felt, a foam, a polymeric film, a membrane, animal skin/hide, leather, or a combination thereof.

Also provided is a method of forming a composite comprising:
a) forming a first array comprising a plurality of laterally spaced first elongate bodies, wherein immediately laterally adjacent first elongate bodies are spaced apart from each other at their nearest longitudinal edges whereby an empty space is between said immediately laterally adjacent first elongate bodies; wherein each of said first elongate bodies comprises at least one filament and optionally comprises a binder coating, said binder coating comprising less than 50% by weight of each of said first elongate bodies;
b) attaching a second array to said first array, wherein said second array comprises a plurality of laterally spaced second elongate bodies, wherein immediately laterally adjacent second elongate bodies are spaced apart from each other at their nearest longitudinal edges whereby an empty space is between said immediately laterally adjacent second elongate bodies; wherein each of said second elongate bodies comprises at least one filament and optionally comprises a binder coating, said binder coating comprising less than 50% by weight of each of said second elongate bodies; wherein said second array is either pre-formed and subsequently attached to said first array, or wherein said second elongate bodies are sequentially applied onto the first elongate bodies of said first array;
wherein the first array overlies the second array and wherein the first elongate bodies are oriented at an angle relative to the second elongate bodies, whereby gaps are defined at the junctions of pairs of overlying, adjacent first elongate bodies and pairs of underlying, adjacent second elongate bodies; and whereby the first elongate bodies and the second elongate bodies are bonded to each other at their junctions; and
c) laminating one or more substrates to said first array and/or to said second array, optionally via an intermediate adhesive scrim.

DETAILED DESCRIPTION

Figure 1:
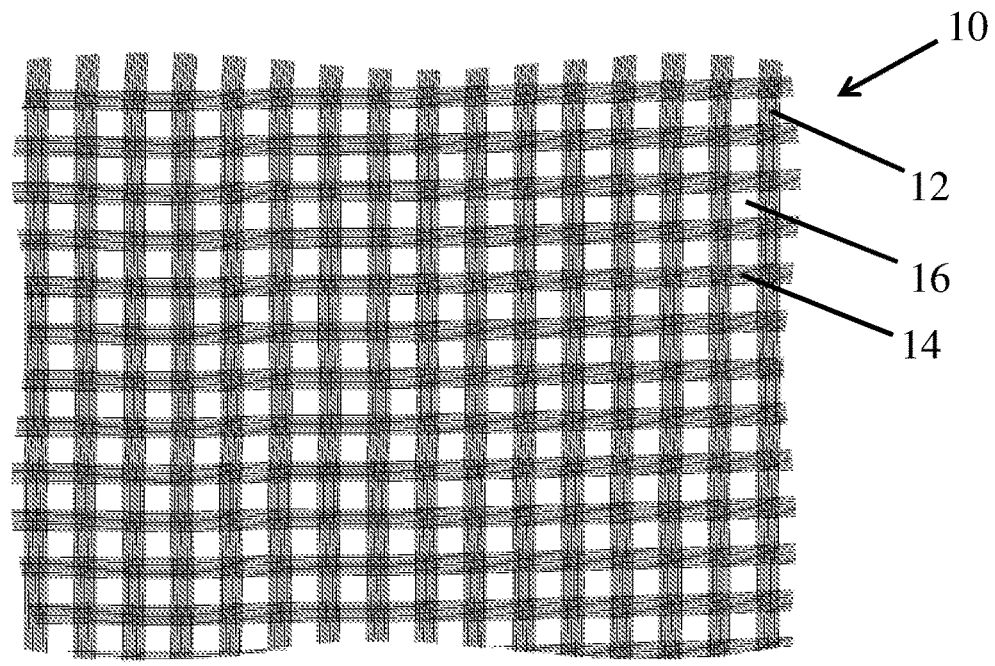
FIG. 1 is a top-view schematic representation of an open, non-woven fibrous fabric having a grid structure formed from two adjoined, orthogonally oriented arrays of elongate bodies.

As illustrated in FIG. 1, an open, non-woven fabric 10 having a grid structure is formed by adjoining a first array of laterally spaced elongate bodies 12 and a second array of laterally spaced elongate bodies 14, wherein the first array overlies the second array. As shown in FIG. 1, an empty space remains between immediately laterally adjacent elongate bodies in each of the arrays forming the grid, wherein the first elongate bodies 12 are oriented at an angle relative to the second elongate bodies 14, preferably being transversely disposed in a 0°/90° orientation. The angled orientation of the spaced apart arrays 12 and 14 defines gaps 16 at the junctions of pairs of overlying, adjacent first elongate bodies (i.e., two elongate bodies 12) and pairs of underlying, adjacent second elongate bodies (i.e., two elongate bodies 14). Each of the first elongate bodies 12 overlies and is bonded to a plurality of the second elongate bodies 14 and each of the second elongate bodies 14 underlies and is bonded to a plurality of the first elongate bodies 12, with said bodies being bonded to each other at their points of overlap, i.e., at their junctions.

As used herein, "elongate bodies" are bodies having a length dimension that is much greater than the transverse dimensions of width and thickness. Such includes continuous filament fibers including continuous monofilament fibers and continuous multifilament fibers, including untwisted multifilament fibers (i.e. untwisted yarns) that are fused or unfused, untwisted thermally fused multifilament tape, or non-fibrous polymeric tape. Such also includes twisted multifilament fibers (i.e. twisted yarns) that are fused or unfused, but it is most preferred that all the elongate bodies forming the fabrics and fused sheets of the disclosure are untwisted elongate bodies, particularly compressed multifilament tapes formed from untwisted fibers.

As used herein, a "high tenacity" elongate body is one having a tenacity of at least about 14 g/denier, more preferably about 20 g/denier or more, still more preferably about 25 g/denier or more, still more preferably about 30 g/denier or more, still more preferably about 40 g/denier or more, still more preferably about 45 g/denier or more, and most preferably about 50 g/denier or more. Such high tenacity elongate bodies also have a tensile modulus of at least about 300 g/denier, more preferably about 400 g/denier or more, more preferably about 500 g/denier or more, still more preferably about 1,000 g/denier or more and most preferably about 1,500 g/denier or more. The high tenacity elongate bodies also have an energy-to-break of at least about 15 J/g or more, more preferably about 25 J/g or more, more preferably about 30 J/g or more and most preferably have an energy-to-break of about 40 J/g or more. Methods of forming elongate bodies having these combined high strength properties are conventionally known in the art. These tensile properties for fibers and yarns are measured by ASTM D2256, and for tapes they are measured by ASTM D882-09.

High tenacity fibers and yarns may be of any suitable denier, but a minimum denier of 100 is most preferred herein. In the most preferred embodiments, elongate bodies comprising fibers/yarns preferably have a denier of from about 100 to about 5,000, still more preferably from about 100 to about 2,000, still more preferably from about 100 to about 1,000, and most preferably from about 100 to about 800 denier.

The term "denier" refers to the unit of linear density, equal to the mass in grams per 9000 meters of fiber/tape. The term "tenacity" refers to the tensile stress expressed as force (grams) per unit linear density (denier) of an unstressed specimen. The "initial modulus" is the property of a material representative of its resistance to deformation. The term "tensile modulus" refers to the ratio of the change in tenacity, expressed in grams-force per denier (g/d) to the change in strain, expressed as a fraction of the original fiber/tape length (in/in).

As used herein, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. Known tapes may be fibrous or non-fibrous, wherein a "fibrous" tape comprises one or more filaments. The cross-section of a tape of this disclosure may be rectangular, oval, polygonal, irregular, or of any shape satisfying the width, thickness and aspect ratio requirements outlined herein.

Such tapes preferably have a substantially rectangular cross-section with a thickness of about 0.5 mm or less, more preferably about 0.25 mm or less, still more preferably about 0.1 mm or less and still more preferably about 0.05 mm or less. In the most preferred embodiments, the polymeric tapes have a thickness of up to about 3 mils (76.2 µm), more preferably from about 0.35 mil (8.89 µm) to about 3 mils (76.2 µm), and most preferably from about 0.35 mil to about 1.5 mils (38.1 µm). Thickness is measured at the thickest region of the cross-section.

Tapes useful herein have preferred widths of from about 2.5 mm to about 50 mm, more preferably from about 5 mm to about 25.4 mm, even more preferably from about 5 mm to about 20 mm, and most preferably from about 5 mm to about 10 mm. These dimensions may vary but the tapes used herein are most preferably fabricated to have dimensions that achieve an average cross-sectional aspect ratio, i.e. the ratio of the greatest to the smallest dimension of cross-sections averaged over the length of the tape article, of greater than about 3:1, more preferably at least about 5:1, still more preferably at least about 10:1, still more preferably at least about 20:1, still more preferably at least about 50:1, still more preferably at least about 100:1, still more preferably at least about 250:1 and most preferred tapes have an average cross-sectional aspect ratio of at least about 400:1.

Tapes are formed by conventionally known methods. For example, a fabric may be cut or slit into tapes having a desired length. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. No. 6,098,510 and U.S. Pat. No. 6,148,871 are incorporated herein by reference to the extent consistent herewith. Such methods are particularly useful for forming non-fibrous polymeric tapes but the method of fabricating non-fibrous, polymeric tapes is not intended to be limiting.

Particularly useful methods for forming multifilament fibrous tapes are described in commonly-owned U.S. Pat. Nos. 8,236,119; 8,697,220; 8,685,519; 8,852,714; 8,906,485, each of which is incorporated herein by reference to the extent consistent herewith. Each of these patents describes methods where a multifilament feed fiber/yarn is compressed and flattened to form a tape. Particularly, U.S. Pat. No. 8,236,119 teaches a process for the production of a polyethylene tape article comprising: (a) selecting at least one polyethylene multifilament yarn, said yarn having a c-axis orientation function at least 0.96, an intrinsic viscosity when measured in decalin at 135° C. by ASTM D1601-99 of from about 7 dl/g to about 40 dl/g, and said yarn having a tenacity of from about 15 g/d to about 100 g/d as measured by ASTM D2256-02 at a 10 inch (25.4 cm) gauge length and at an extension rate of 100%/min; (b) placing said yarn under a longitudinal tensile force and subjecting said yarn to at least one transverse compression step to flatten, consolidate and compress said yarn at a temperature of from about 25° C. to about 137° C., thereby forming a tape article having an average cross-sectional aspect ratio at least about 10:1, each said compression step having an outset and a conclusion wherein the magnitude of said longitudinal tensile force on each said yarn or tape article at the outset of each said compression step is substantially equal to the magnitude of the longitudinal tensile force on the yarn or tape article at the conclusion of that same compression step, and is at least about 0.25 kilogram-force (2.45 Newtons); (c) stretching said tape article at least once at a temperature in the range of from about 130° C. to about 160° C. at a stretch rate of from about 0.001 $min^{-1}$ to about 1 $min^{-1}$; (d) optionally repeating step (b) one or more times at a temperature from about 100° C. to about 160° C.; (e) optionally repeating step (c) one or more times; (f) optionally relaxing the longitudinal tensile force between any of steps (b) to (e); (g) optionally increasing the longitudinal tensile force between any of steps b) to (e); and (h) cooling said tape article to a temperature less than about 70° C. under tension. This process may also be modified by, prior to step (b), optionally continuously passing the yarn through one or more heated zones at temperatures of from about 100° C. to about 160° C. under tension, followed by stretching the heated yarn at least once at a stretch rate of from about 0.01 $min^{-1}$ to about 5 $min^{-1}$. The compressed and flattened multifilament tapes formed according to the methods of these commonly-owned patents are particularly desirable herein.

Particularly suitable high-strength, high tensile modulus non-fibrous polymeric tape materials are polyolefin tapes. Preferred polyolefin tapes include polyethylene tapes, such as those commercially available under the trademark TENSYLON®, which is commercially available from E. I. du Pont de Nemours and Company of Wilmington, Del. See, for example, U.S. Pat. Nos. 5,091,133; 7,964,266; 7,964,267; and 7,976,930, all of which are incorporated herein by reference. Also suitable are polypropylene tapes, such as those commercially available under the trademark TEGRIS® from Milliken & Company of Spartanburg, S.C. See, for example, U.S. Pat. No. 7,300,691 which is incorporated herein by reference. Polyolefin tape-based composites that are useful as spall resistant substrates herein are also commercially available, for example under the trademark DYNEEMA® BT10 from Royal DSM N.V. Corporation of Heerlen, The Netherlands and under the trademark ENDUMAX® from Teijin Aramid Gmbh of Germany. Also useful are the fibrous and non-fibrous tapes described in commonly-owned U.S. patents publications Nos. 8,986,810; 9,138,961 and 9,291,440, each of which is incorporated herein by reference to the extent consistent herewith. Non-fibrous, polymeric tapes useful herein will have the same preferred thicknesses and aspect ratios as the fiber-based tapes, but may be fabricated to have wider widths of from about 2.5 mm to about 21 cm, more preferably from about 2.5 mm to about 10 cm, still more preferably from about 2.5 mm to 5 cm, still more preferably from about 2.5 mm to about 25 mm, even more preferably from about 5 mm to about 20 mm, and most preferably from about 5 mm to about 10 mm.

Like fibers, multifilament tapes may be fabricated from the exact same polymer types discussed above for fibers, because such tapes are formed by compressing and flattening such fibers. Accordingly, like fibers, the tapes may be of any suitable denier, but preferably have a denier of from about 100 to about 5,000, still more preferably from about 100 to about 2,000, still more preferably from about 100 to about 1,000, and most preferably from about 100 to about 800 denier.

Most preferably, when the elongate bodies comprise multifilament fiber bundles/yarns/tapes, the elongate bodies have a denier per filament of 1.5 or more (1.5 dpf), more preferably from about 1.5 dpf up to about 10 dpf, still more preferably from about 1.5 dpf up to about 8 dpf, and still more preferably from about 1.5 dpf up to about 6 dpf. In this regard, the elongate body denier/dpf, as well as the spacing of the bodies, affects the crossover density of the ultimate open, non-woven fabric. In this regard, each of the first elongate bodies overlies and is bonded to a plurality of the second elongate bodies, and wherein each of the second elongate bodies underlies and is bonded to a plurality of the first elongate bodies, whereby the first elongate bodies and the second elongate bodies are bonded to each other at their junctions. Each of the locations where the first array of elongate bodies and second array of elongate bodies overlap is referred to as a crossover. The number of crossovers in a particular area is known as the crossover density. In a preferred embodiment of the disclosure, the crossover density of the open, non-woven fabrics is from about 5 to about 10 crossovers per square inch, more preferably from about 6 to about 9 crossovers per square inch of the composite.

With respect to the tensile properties of useful tapes, the tapes are preferably "high tensile strength" tapes having a tenacity of at least 10 g/denier, an initial tensile modulus of at least about 150 g/denier or more, and an energy-to-break of at least about 8 J/g or more, each as measured by ASTM D882-09 at 10 inch (25.4 cm) gauge length and at an extension rate of 100%/min. The high tensile strength tapes preferably have a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier, each as measured by ASTM D882-09 at 10 inch (25.4 cm) gauge length and at an extension rate of 100%/min.

While the open, non-woven, grid structures of the disclosure as illustrated in FIG. 1 are most preferably formed from elongate bodies that comprise compressed, multifilament tapes, it should be understood that such is non-limiting and the elongate bodies of the disclosure may also be formed from non-compressed, filaments, fibers and/or yarns, or combinations of such filaments/fibers/yarns with said tapes. Fibers and yarns are distinguished from filaments in that fibers and yarns are formed from filaments. A fiber may be formed from just one filament or from multiple filaments. A fiber formed from just one filament is referred to either as a "single-filament" fiber or a "monofilament" fiber, and a fiber formed from a plurality of filaments (i.e., a bundle of filaments) is referred to as a "multifilament" fiber. A "yarn" is defined as a single strand consisting of multiple filaments, analogous to a multifilament fiber. A typical multifilament fiber (fiber bundle), yarn and typical multi-filament tape will have from about 30 to about 2000 individual filaments, while also being characterized by the dpf and tensile properties referenced herein (e.g., 1.5-10 dpf and 10-60 g/d or more). The cross-sections of fibers, filaments and yarns may vary and may be regular or irregular, including circular, flat or oblong cross-sections. Multifilament fibers/yarns as used herein preferably substantially retain their shape upon attachment of the arrays together whereby any spreading of the filaments forming the bundles/yarns, if any, is minimal and will not close the gaps in the open, non-woven fabric.

The high tenacity elongate bodies of each of said first and second arrays, and any additional arrays, and have a preferred tenacity of at least about 14 g/denier and a preferred tensile modulus of at least about 300 g/denier. They may be formed from any conventionally known thermoplastic polymer type. Particularly suitable are elongate bodies formed from polyolefins, including polyethylene and polypropylene; polyesters, including polyethylene terephthalate, polypropylene terephthalate, and polybutylene terephthalate; polyamides; polyphenylenesulfide; gel spun polyvinyl alcohol (PVA); gel spun polytetrafluoroethylene (PTFE); and the like. Particularly preferred are extended chain polyolefin elongate bodies, such as highly oriented, high molecular weight polyethylene, particularly ultra-high molecular weight polyethylene (UHMW PE) elongate bodies, and ultra-high molecular weight polypropylene elongate bodies.

Each of these elongate body types described above is conventionally known in the art. Also suitable for producing polymeric elongate bodies are copolymers, block polymers and blends of the above materials. For example, useful elongate bodies may be formed from multifilament elements comprising at least two different filament types, such as two different types of UHMW PE filaments or a blend of polyester filaments and UHMW PE filaments.

Thermoplastic high tenacity elongate bodies are most suitable herein because they are capable of being deformed by thermal, solid state deformation. Such excludes non-thermoplastic synthetic fibers such as carbon fibers, aramid fibers, glass fibers, polyacrylic fibers, aromatic polyamide fibers, aromatic polyester fibers, polyimide fibers, etc. Specifically most preferred are elongate bodies formed from ultra high molecular weight polyethylene. Ultra high molecular weight polyethylene filaments, fibers and yarns are formed from extended chain polyethylenes having molecular weights of at least 300,000, preferably at least one million and more preferably between two million and five million. Such extended chain polyethylene fibers/yarns may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber types are any of the polyethylene fibers sold under the trademark SPECTRA® from Honeywell International Inc, including SPECTRA® 900 fibers, SPECTRA® 1000 fibers and SPECTRA® 3000 fibers, all of which are commercially available from Honeywell International Inc. of Morris Plains, N.J.

The most preferred UHMW PE fibers have an intrinsic viscosity when measured in decalin at 135° C. by ASTM D1601-99 of from about 7 dl/g to about 40 dl/g, preferably from about 10 dl/g to about 40 dl/g, more preferably from about 12 dl/g to about 40 dl/g, and most preferably, from about 14 dl/g to 35 dl/g. The most preferred UHMW PE fibers are highly oriented and have a c-axis orientation function of at least about 0.96, preferably at least about 0.97, more preferably at least about 0.98 and most preferably at least about 0.99. The c-axis orientation function is a description of the degree of alignment of the molecular chain direction with the filament direction. A polyethylene filament in which the molecular chain direction is perfectly aligned with the filament axis would have an orientation function of 1. C-axis orientation function ($f_c$) is measured by the wide angle x-ray diffraction method described in Correale, S. T. & Murthy, Journal of Applied Polymer Science, Vol. 101, 447-454 (2006) as applied to polyethylene.

When it is desired to utilize twisted elongate bodies, various methods of twisting fibers/yarns are known in the art and any method may be utilized. In this regard, twisted multifilament tapes are formed by first twisting a feed fiber/yarn precursor, followed by compressing the twisted precursor into a tape. Useful twisting methods are described, for example, in U.S. Pat. Nos. 2,961,010; 3,434,275; 4,123,893; 4,819,458 and 7,127,879, the disclosures of which are incorporated herein by reference. The fibers/yarns are twisted to have at least about 0.5 turns of twist per inch of fiber/yarn length up to about 15 twists per inch, more preferably from about 3 twists per inch to about 11 twists per inch of fiber/yarn length. In an alternate embodiment, the fibers/yarns are twisted to have at least 11 twists per inch of fiber/yarn length, more preferably from about 11 twists per inch to about 15 twists per inch of fiber/yarn length. The standard method for determining twist in twisted yarns is ASTM D1423-02.

When it is desired to utilize fused elongate bodies, various methods of fusing fibers/yarns are known in the art and any method may be utilized. Fused multifilament tapes are formed by first fusing a feed fiber/yarn precursor followed by compressing the fused precursor into a tape. In this regard, fusion of the fiber/yarn/filaments may be accomplished by with the use of heat and tension, or through application of a solvent or plasticizing material prior to exposure to heat and tension as described in U.S. Pat. Nos. 5,540,990; 5,749,214; and 6,148,597, which are hereby incorporated by reference to the extent compatible herewith. Fusion by bonding may be accomplished, for example, by at least partially coating the filaments with a resin or other polymeric binder material having adhesive properties. Suitable resins/polymeric binder materials include both low tensile modulus, elastomeric materials and high tensile modulus materials. As used herein throughout, the term tensile modulus means the modulus of elasticity, which for polymeric binder materials is measured by ASTM D638. A low or high modulus binder may comprise a variety of polymeric and non-polymeric materials. For the purposes of this disclosure, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (Tg) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. Whether a low modulus material or a high modulus material, the polymeric binder may also include fillers such as carbon black or silica, may be colored with pigments or dyes, may be extended with oils, or may be vulcanized by sulfur, peroxide, metal oxide or radiation cure systems as is well known in the art.

A wide variety of materials and formulations may be utilized as a low modulus polymeric binder. Representative examples include polyethylene, polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex., including low modulus polystyrene-polyisoprene-polystyrene block copolymers sold under their trademark KRATON®. Also useful are resin dispersions of styrene-isoprene-styrene (SIS) block copolymer sold under the trademark PRINLIN® and commercially available from Henkel Technologies, based in Düsseldorf, Germany.

High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. Also useful is a thermosetting polymer that is soluble in carbon-carbon saturated solvents such as methyl ethyl ketone, and possessing a high tensile modulus when cured of at least about $1\times10^6$ psi (6895 MPa) as measured by ASTM D638. Also useful are the binder materials described in U.S. Pat. No. 6,642,159, the disclosure of which is incorporated herein by reference.

Most specifically preferred binder polymers are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

The filaments of multifilament bodies may also be thermally bonded together without an adhesive coating. Thermal bonding conditions will depend on the fiber type. When the feed fibers/yarns are coated with a resin or other polymeric binder material having adhesive properties to bond the filaments, only a small amount of the resin/binder is needed. In this regard, the quantity of resin/binder applied is preferably no more than 5% by weight based on the total weight of the filaments plus the resin/binder, such that the filaments comprise at least 95% by weight of the coated fiber/yarn based on the total weight of the filaments plus the resin/binder, and the corresponding tape formed from the yarn will thereby also comprise at least 95% by weight of the component filaments. More preferably, the fibers/yarns and tapes comprise at least about 96% filaments by weight, still more preferably 97% filaments by weight, still more preferably 98% filaments by weight, and still more preferably 99% filaments by weight. The fibers/yarns and compressed tapes formed therefrom may also be resin-free, i.e., not coated with a bonding resin/binder, and consist essentially of or consist only of filaments.

It is also within the scope of this disclosure that fibers or mono/multifilament tapes may be washed or scoured to at least partially remove surface finishes and/or optionally subjected to a plasma or corona treatment to improve their ability to bond with applied coatings. Suitable scouring methods and plasma/corona treatment methods are conventionally known, and the most preferred methods are those described in commonly-owned U.S. pre-grant publication 2013/0059496, which is incorporated by reference herein to the extent consistent herewith.

Figure 2:
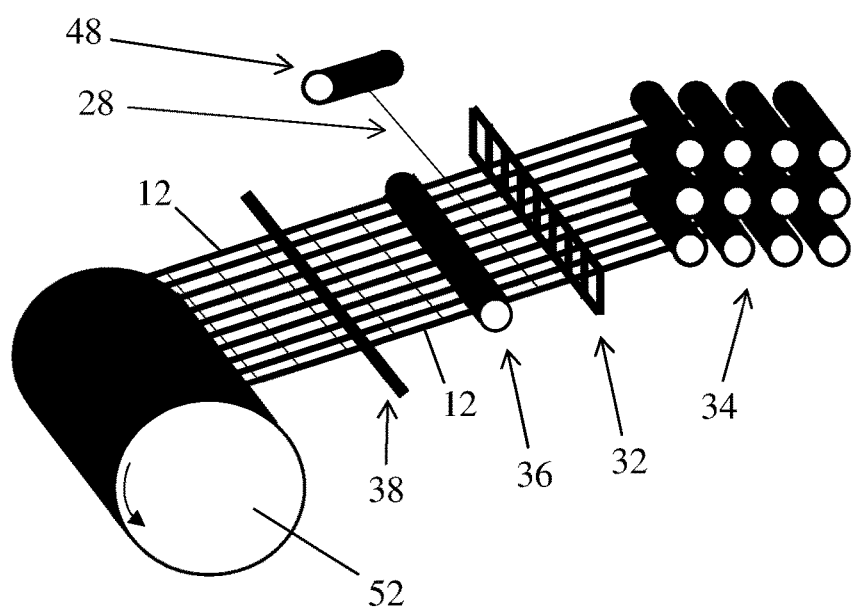
FIG. 2 is a top perspective view schematic representation of the formation of an array of high tenacity elongate bodies that are spaced apart by passage through a heddle.

Each of the first array 12 and second array 14 is formed using equipment that is conventional in forming unidirectional non-woven fabrics, but with the specification that adjacent elongate bodies are spaced apart from each other. A preferred method is illustrated in FIG. 2 (not drawn to scale). As illustrated, a plurality of spools of fiber/yarn/tape (i.e., a length of fiber or yarn or tape wound around a central cylinder) are provided and mounted on one or more creels 34 (also referred to in the art as a "thread stand"; the type of support for the spools of elongate bodies is not intended to be limiting). Each spool of fiber/yarn/tape is mounted on mounting pins of the creel apparatus 34 and a leading end of the elongate body is led from each spool through a heddle 32 (also known as a "reed") having slots that allow for the separation of adjacent elongate bodies 12 as shown so that they are spaced apart from each other at their nearest longitudinal edges. The number of slots and spacing of the slots in heddles are variable, as is known in the art, which allows the spacing to be customized by any distance as desired.

In the preferred embodiments of this disclosure, the heddle 32 (or other elongate body separating means) separates adjacent high tenacity elongate bodies 12 so that they are spaced apart at their nearest longitudinal edges by at least about 1/16 inch (0.15875 cm), preferably from about 1/16 inch up to about 1 inch (2.54 cm) or any range in between those points. More preferably, the elongate bodies in the first array (and all other arrays) are separated from each other at their nearest longitudinal edges by about 1/16 inch up to about 1 inch (2.54 cm), still more preferably from about 1/16 inch up to about ½ inch (1.27 cm), still more preferably from about 1/16 inch up to about ¼ inch (0.635 cm), and still more preferably from about 1/16 inch up to about ⅛ inch (0.3175 cm). In other embodiments, larger gap sizes are preferred with spacing between all elongate bodies in all arrays being greater than 1.0 cm wide, more preferably ≥1.1 cm wide, or ≥1.2 cm wide, or ≥1.3 cm wide, or ≥1.4 cm wide, or ≥1.5 cm wide or any of these widths up to about 1 inch (2.54 cm) or even greater (e.g., up to 2 inches (5.08 cm). All ranges presented this application are interpreted to include all values in between the recited minimum and maximum values. In any grid structure, irrespective of the spacing width between elongate bodies, the spacing between all elongate bodies in all arrays that are arranged at 0°/90° (i.e., perpendicular first and second arrays) are preferably equal, thereby forming a square gap.

Figure 11:
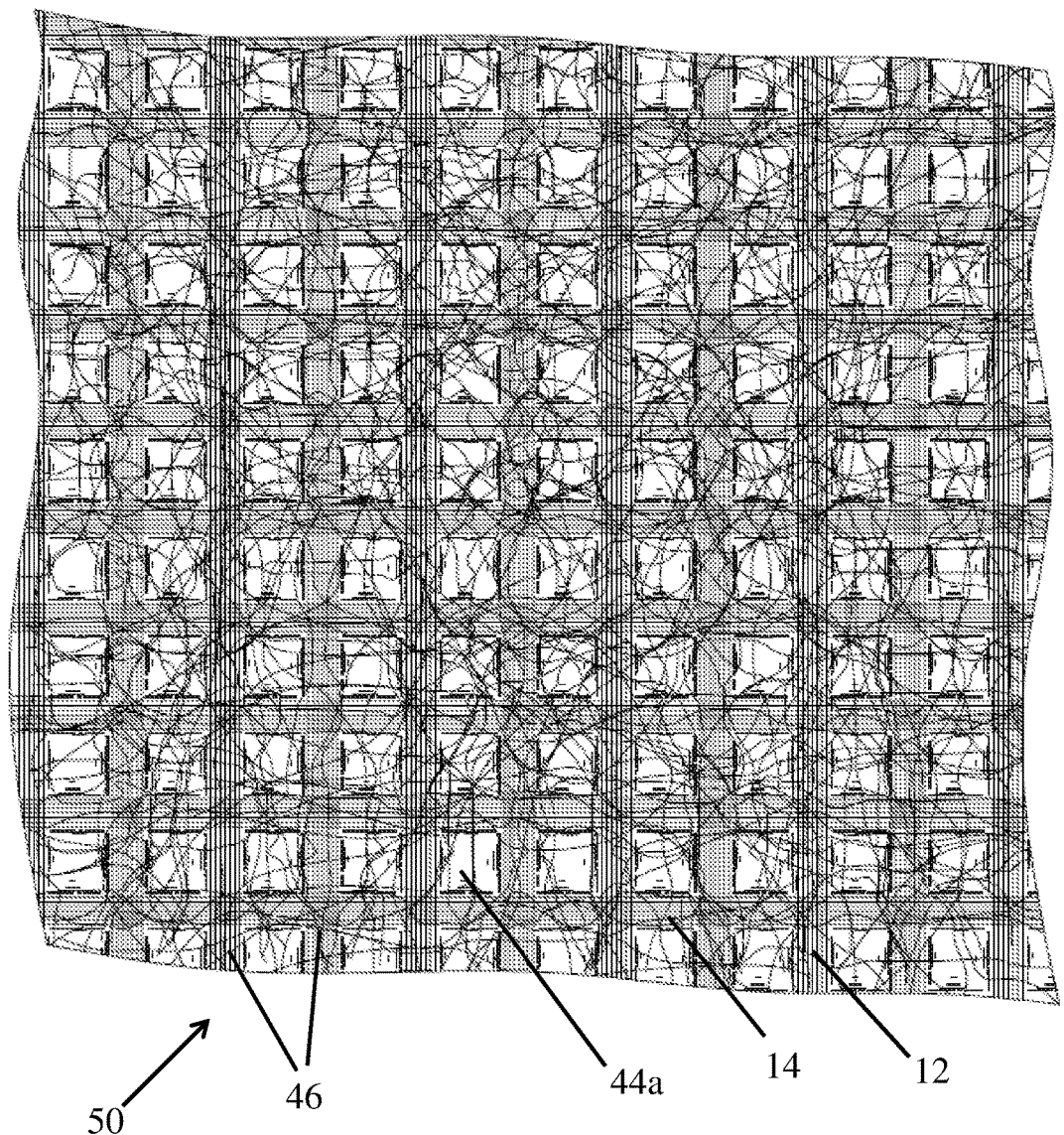
FIG. 11 is a front-view schematic representation of a composite having a grid fabric structure as illustrated in FIG. 1 laminated to a polymeric substrate, resulting in the formation of rectangular protrusions, wherein a substrate is bonded to the grid fabric structure with an intermediate adhesive scrim positioned between the grid fabric and the substrate.
Figure 12:
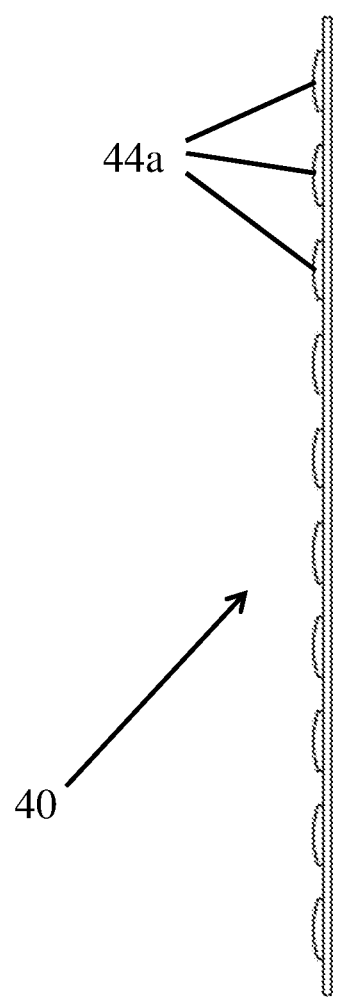
FIG. 12 is a side perspective view schematic representation of a composite as illustrated in FIGS. 8-11.

Once the fiber/yarn/tape ends are transported through the heddle 32 they are passed through a collimating/positioning apparatus that orients the elongate bodies coplanarly into the desired side-by-side, spaced parallel array. The collimating/positioning apparatus may be a collimating comb, a fixed gap rotary die, a stationary grooved bar, or another similar apparatus as would be determined by one skilled in the art. As shown in FIG. 2, the array of elongate bodies 12 (and/or 14) is preferably pulled through one or more stationary grooved rolls/bars 36. The grooves in the roll/bar 36 hold the fiber/yarn/tape ends in place as they are passed from the heddle 32 to an optional storage roll 52. Although the stationary grooved roll/bar 36 is illustrated in FIG. 2 as being positioned between the heddle 32 and storage roll 52, this position is only exemplary and stationary grooved rolls/bars 36 may be placed in other locations or entirely eliminated as would be determined by one skilled in the art. For example, as illustrated in FIG. 11, such stationary grooved rolls/bars may be placed inside a dip and squeeze coater, as discussed in greater detail below, or such stationary grooved rolls/bars 36 may be used in both locations.

In order to stabilize the array of elongate bodies, it may be desired to transversely lay one or more binding elongate bodies 28 on an upper or lower surface of the array as illustrated in FIG. 2. As used herein, a "binding" elongate body is an elongate body that at least partially comprises a heat activated thermoplastic polymer having a melting temperature below a melting temperature of the high tenacity elongate bodies. Such are conventionally known in the art and non-exclusively include bodies comprising ethylene-vinyl acetate, ethylene-acrylate copolymers, styrene block copolymers, polyurethanes, polyamides, polyesters and polyolefins, including and most preferably polyethylene. Such binding elongate bodies are most commonly monofilament bodies having a similar shape to monofilament fibers and having regular or irregular cross-sectional shapes, including circular, flat or oblong cross-sections. The binding elongate bodies preferably have a denier of from about 20 to about 2000, more preferably from about 50 to about 800, still more preferably from about 60 to about 700, still more preferably from about 100 to about 675, and most preferably from about 200 to about 500.

If incorporated, the binding elongate bodies 28 are unwound from one or more spools that are supported on one or more creels 48 or on another type of thread stand/support. The type of support for the optional binding bodies is not intended to be limiting. Although FIG. 2 shows the optional binding bodies being applied after the elongate bodies 12 are passed through the heddle 32 and stationary grooved bars 36, this position is only exemplary and the optional binding bodies 28 may be applied in other locations along the array(s) as determined by one skilled in the art. As preferred herein, only the transversely disposed binding elongate bodies, when incorporated, are present in the space between said adjacent high tenacity elongate bodies in each of the first array of elongate bodies 12 and second array of elongate bodies 14.

After the optional binding elongate bodies 28 are laid upon the high tenacity elongate bodies 12 as illustrated in FIG. 2, the high tenacity elongate bodies 12 (and/or 14) and binding elongate bodies 28 may then be thermally bonded together at their points of intersection. Such thermal bonding is accomplished by at least partially melting the thermoplastic polymer component of the binding elongate bodies 28 with a heating element 38, thereby activating the thermoplastic polymer so that it is capable of adhering to the high tenacity elongate bodies (and/or 14) and then allowing the melted thermoplastic polymer of the binding elongate bodies 28 to solidify. Once the polymer is solidified at the junction point, the binding elongate bodies 28 are bonded to the high tenacity elongate bodies 12 (and/or 14), thereby forming a dimensionally stable open grid-like fabric.

While heating element 38 is illustrated in FIG. 2 as a rectangular bar that heats by direct contact with the binding bodies 28 (i.e., conductive heating), heating may be accomplished by any suitable method including convective heating (e.g. hot air), radiant heating (e.g. infrared heating) as well as any other means of conductive heating. Heating element 38 preferably heats the binding elongate bodies to a temperature of from about 270° F. (~132° C.) to about 330° F. (~166° C.), more preferably from about 280° F. (~138° C.) to about 320° F. (~160° C.), still more preferably from about 285° F. (~141° C.) to about 315° F. (~157° C.), and most preferably from about 290° F. (~143° C.) to about 310° F. (~154° C.).

This bonding of the bodies to each other with binding elongate bodies 28 mechanically stabilizes the open fabric structure by fixing the binding elongate bodies 28 in their position and thereby achieving fixed gaps between the high tenacity elongate bodies 28 (and/or 14) that are maintained during fabric handling, and ensures that the dimensions of all gaps in the fabric are identical to each other and unchanged during processing. The bonding step is also preferably achieved without external pressure. The heat from heating element 38 for bonding is adequate to make the adhesive coating tacky so that the bodies become sufficiently bonded at the body crossing points. External pressure on the fabric may also be used to bond the bodies together, such as by passing the combination through a pair of rolls (not shown) after application of the binding bodies. Once the elongate bodies 12 are properly fabricated into a first array, this process may be repeated to form an identical second array of fibers 14 which may also optionally incorporate stabilizing binding elongate bodies as described above. After each of the first array and second array are fabricated, they each may be wound onto a storage roll 46 and saved for subsequent processing.

Instead of, or in addition to, utilizing binding elongate bodies 28 as described above, the bodies 12 and 14 may be coated with a binding adhesive. This is particularly preferred if the elongate bodies are fibers/yarns or tapes that have not already been fused together with a binder as described above. Additionally, in order to properly bond the bodies of the respective arrays together, it is generally preferred for the bodies to be coated with an adhesive. In this regard, any of the polymeric binder materials already described above in the discussion of tape fusion is useful for this purpose. Methods for applying a polymeric binder material to the elongate bodies are well known the most appropriate method would be readily determined by one skilled in the art. In this regard, particular use of a term such as "coated" is not intended to limit the method by which the binder is applied onto the elongate bodies. Useful methods include, for example, spraying, extruding, pad coating, dip coating or roll coating polymers or polymer solutions onto the elongate bodies, as well as transporting the elongate bodies through a molten polymer or polymer solution.

The binder may be applied at any point in the fabrication process prior to bonding of the arrays to each other or to other substrates, including any time before or after a plurality of elongate bodies are arranged into an array. In the most preferred embodiments, the already-assembled arrays of elongate bodies are coated with a resin just prior to bonding the plurality of arrays together to form the open, non-woven fabric. In a typical process, such as that illustrated in FIG. 11, an uncoated array of elongate bodies is passed through a bath of resin, such as a dip and squeeze coater, followed by passing the coated array through a nip to squeeze off excess resin. As illustrated, one or more grooved rolls/bars or other bars/rolls may be incorporated in the dip coater to aid in keeping the bodies of the array in their proper position. The coated array is then applied onto a release film/paper (e.g., silicone release paper), joining them together such as by passing them both through a combining roller (as shown in FIG. 11) with optionally passing the combination through a platen (not shown; preferably a heated platen) to hold the array of bodies in their proper position. The resin coated array on the release paper is then optionally dried. At this point, the coated array may be wound onto a storage roll 52 (or other storage means) as shown in FIG. 2 for later use, or may be directly further processed into a grid by joining together multiple arrays.

In the most preferred embodiments, each of the individual elongate bodies of each array of bodies is coated with the polymeric binder material so that all or substantially all (i.e., at least 75%, or at least about 85%, or at least about 95%) of the body surface area is covered with the polymeric binder material. Therefore, when the bodies are coated with a binder, each elongate body of each array of the non-woven fabric will comprise at least one filament and a binder coating. However, it is important that each of the elongate bodies of the non-woven composites include a greater amount of the filament component than the binder component, i.e., the binder comprises less than 50% by weight of each elongate body, and more preferably the binder comprises no more than 40% by weight of each of the elongate bodies individually, optionally comprising from about 10% by weight up to about 40% by weight of said fabric, or from about 15% by weight up to about 40% by weight of said fabric (i.e., by weight of the arrays of elongate bodies (i.e., the grid) plus the binder exclusive of other attached layers. Greater amounts of the binder polymer will reduce the overall strength of the open non-woven fabric as well as the appearance of the fabric. Alternatively, even lower quantities of adhesive/binder resin may be incorporated, with the total weight of an adhesive/binder component of each elongate body individually comprising from about 0% to about 10%, still more preferably from about 0% to about 5% by total weight of the elongate bodies individually. Additionally, irrespective of the type of binder coating, each elongate body should comprise at least about 90% of the filament component by volume, more preferably at least about 95% of the filament component by volume, even more preferably at least about 98% of the filament component by volume, and most preferably at least about 99% by volume of the filaments plus the binder. Importantly, applying the binder in such low quantities maximizes the mechanical strength of the open, non-woven fabric and ensures that the gaps formed by the arrays of spaced elongate bodies remain open and are not filled by flowing of the resin. Accordingly, the binder resin weight percentages for each individual fiber correlate to the binder resin weight percentages for the overall non-woven fabric. In this regard, the open, non-woven fabrics of the disclosure preferably have a total areal density of from about 6 grams/m² to about 50 grams/m², more preferably from about 6 grams/m² to about 24 grams/m², with each individual array of elongate bodies therefore having preferred a total areal density of from about 3 grams/m² to about 25 grams/m², more preferably from about 3 grams/m² to about 12 grams/m². Additionally, each array of elongate bodies preferably has a fiber areal density (i.e., the filament component, excluding any binder component (FAD)) of less than about 10 grams/m². In this regard, each of the elongate bodies in each array preferably have the same FAD and total areal density (TAD) as each other, but the elongate bodies of the first array and second array may differ to form a hybrid grid structure. For example, the first array may comprise elongate bodies having a greater FAD and/or TAD than the elongate bodies of the second array.

While it is preferred that the elongate bodies in the first array may be the same as each other, they may also differ in other ways than just their areal densities. For example, the first array and the second array are preferably substantially the same, wherein the elongate bodies forming the first array and the elongate bodies forming the second array all comprise the same fiber/tape type, have substantially the same dimensions, and have substantially the same spacing between adjacent elongate bodies. However, the first array and the second array may be different, wherein the elongate bodies forming the first array have different deniers than the elongate bodies forming the second array, or wherein the spacing between adjacent elongate bodies of the first array is different than the spacing between adjacent elongate bodies of the second array, or wherein the elongate body types have different dimensions or are formed from different body types (e.g., different fiber/tape types or different types of resin coatings).

Figure 13:
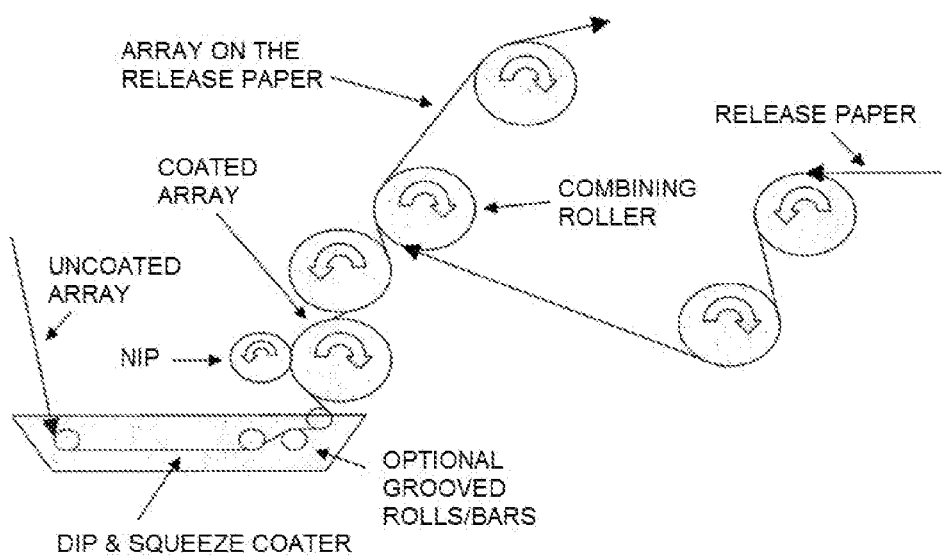
FIG. 13 is a schematic perspective view of an array being coated with a binder resin by passage through a dip coater followed by joining the coated array applying the coated array onto a release film.

The array forming steps described above may be repeated several times to produce any number of arrays of parallel, unidirectional elongate bodies as desired. After the desired number of arrays of fibers/yarns/tapes are fabricated, the arrays of elongate bodies (whether coated, uncoated, or a combination of coated and uncoated arrays) are then stacked on top of each other, most preferably coextensively, with the elongate bodies 12 of a first array being oriented at an angle relative to the elongate bodies 14 of a second array, followed by bonding them together whereupon they are bonded to each other at their junctions (i.e., at the points of overlap as illustrated in FIG. 1). In order to minimize any possible filament spreading while bonding the arrays, they are preferably not laminated together under pressure but rather are first coated with a binder resin and applied to a release paper substrate (as illustrated in FIG. 13), followed by cross-plying two separate arrays together at the desired axial, angular orientation (e.g., perpendicular to each other), and then wet bonding/drying (or resin curing) them together, preferably without being laminated together and with only contact pressure. In this regard, the plurality of arrays may be bonded together where the resin on one or both arrays is wet, or the coatings may be dry and still have sufficient adhesive properties to bond the bodies to each other. If release papers were used, they are to be stripped from the so formed grid and discarded. Further, either prior to or after bonding the arrays together, the arrays/grid may be cut to the desired size before being preferably used for further processing, e.g., attachment to one or more substrates.

Once joined together, the merged combination of the first array and second array forms a new monolithic, single layer structure. Most preferably, the elongate bodies 12 of a first array and the elongate bodies of a second array 14 are oriented perpendicularly to each other as illustrated in FIG. 1, i.e., at 0°/90° orientations relative to the each of their respective longitudinal axes to form a grid structure. Although orthogonal 0°/90° elongate body orientations are preferred, adjacent arrays can be aligned at virtually any angle between about 0° and about 90° with respect to the central longitudinal axis of the high tenacity elongate bodies of an immediately adjacent, overlying or underlying array. For example, an open non-woven fabric of the disclosure may including four arrays with the respective elongate bodies oriented at 0°/+45°/90°/−45° relative to each adjacent ply, or at other angles, such as rotations of adjacent arrays in 15° or 30° increments, with respect to the longitudinal axis of the high tenacity elongate bodies. Most preferably, the open, non-woven fabrics include only 2, 3 or 4 total arrays, with a 2-array fabric having bodies oriented at 0°/90°, a 3-array fabric having bodies oriented at 0°/±45°/90° and a 4-array fabric having bodies oriented at 0°/+45°/90°/−45°.

As just noted, the multiple stacked arrays of bodies are lightly bonded together by wet bonding/drying to form the non-woven, open fabric layer. In some embodiments, a plurality of these "layers" may also be bonded together to form a multilayer grid structure. For example, a first grid layer comprising bonded first and second arrays may be bonded to a second grid layer comprising first and second arrays, wherein the first and second grid layers are preferably cross-plied at an angle to each other (any angle as discussed above, e.g., 0°, 90°, +45°, −45°, 30°, 60°, or other angles, such as rotations of adjacent arrays in 15° or 30° increments, with respect to the longitudinal axis of the high tenacity elongate bodies) and bonded together, preferably wherein the first grid layer has the same composition and construction as the second grid layer.

Together, the bonded arrays are merged to form a unitary, single layer, unitary non-woven grid structure. The non-woven grid structure, prior to optionally being shaped, is substantially or completely flat in that there is no crimping or undulations as found in a woven fabric. Further, importantly, upon bonding the arrays of elongate bodies to each other, the elongate bodies of the first array are bonded to the elongate bodies of the second array and spaces remain between all adjacent elongate bodies in each array and whereby gaps are defined at the junctions of pairs of overlying, adjacent first elongate bodies and pairs of underlying, adjacent second elongate bodies as illustrated in FIG. 1. Any flattening or spreading of multifilament fibers during the bonding process is insufficient to close the gaps between the elongate bodies. In this regard the lateral gap width is preferably more than twice (2×) the width of the elongate bodes, or more than three times (3×) greater than the width of the elongate bodies, or more than four times (4×) greater than the width of the elongate bodies, or even or more than five times (5×) greater than the width of the elongate bodies, wherein the elongate bodies in each array are preferably of the same width as each other. Following bonding of the arrays to each other, the gaps between elongate bodies in each array are preferably at least about 1/16 inch wide up to about ½ inch (1.27 cm), still more preferably from about 1/16 inch up to about ¼ inch (0.635 cm), and still more preferably from about 1/16 inch up to about ⅛ inch (0.3175 cm).

Once the plurality of arrays have been bonded to each other, the resulting open, non-woven fabric is preferably coupled with one or more substrates to form a multilayer composite article, such as by thermal lamination. Normally such lamination is conducted in a flat-bed laminator, in a double belt or steel belt press or in a calendar nip set, although other methods may be used as desired by one skilled in the art. Lamination may be performed, for example, at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. In this regard, low lamination pressures of below 350 psi (2.4 MPa), at temperatures of from about 225° F. (107.22° C.) to about 275° F. (135° C.), and short lamination times of below about 60 seconds are most preferred when forming the composite laminate, with an achievable productivity rate when forming the composite on a flatbed laminator of at least about 10 m/min (at below 350 psi).

Useful substrates to which the open, non-woven grid fabric may be laminated to non-exclusively include woven fabrics, other non-woven fabrics (particularly a closed non-woven fabric having no gaps between fibers, unlike the grid structure of this disclosure), knit fabrics, felts, foams, polymeric films, thin porous or non-porous membranes, animal skins/hides, leather, or a combination thereof depending on the desired end use. Particularly, it has been discovered that the open, non-woven fabrics are particularly desirable for the fabrication of breathable articles having enhanced structural strength compared to breathable articles of the related art when said fabrics are laminated to porous substrate materials or to breathable substrates which may be porous or non-porous. As used herein, a "breathable" material (e.g., fabric, other substrate or composite article), is defined as a material through which water vapor can pass while liquids cannot pass through.

In one preferred embodiment, a single open, non-woven fabric may be attached to a water-resistant, breathable membrane that is impervious to liquid such as water but permeable to gases such as water vapor. Such are conventionally known in the art. Suitable water-resistant, breathable membranes non-exclusively include thermoplastic polyurethane (TPU) and copolyester waterproof breathable films commercially available from Argotec, LLC of Greenfield, Mass., USA (or similar from others), including their ARGOTHANE® aromatic polyethers/thermoplastic polyurethane membranes, ARGOTHANE® aromatic polyesters/thermoplastic polyurethane, ARGOTHANE® aliphatic polyesters, ARGOTHANE® aliphatic polycaprolactones/thermoplastic polyurethane, ARGOTHANE® waterproof breathable films/thermoplastic polyurethane, ARGOFLEX® waterproof-breathable films/thermoplastic polyurethane, and/or ARGOTEC® waterproof-breathable films.

In other embodiments, the non-woven grid fabric may be laminated to a water-resistant, breathable fabric. Suitable water-resistant, breathable fabrics non-exclusively include GORE-TEX® polytetrafluoroethylene fabrics commercially available from W. L. Gore & Associates of Newark, Del., USA. Useful water-resistant, breathable fabrics include fabrics that are made waterproof or water-resistant with an applied coating of a durable water repellent coating, such as water repellent polyurethane. Also useful are a range of commercially available fabrics which may or may not be breathable and may or may not be water repellent/resistant, including fabrics commercially available from Chamatex SA of Ardoix, France, such as their fabrics formed from polyester, polyamide (nylon), cotton, viscose or aramid fibers, as well as similar fabrics from other manufacturers. Particularly preferred substrates are fabrics formed from melt spun fibers. With regard to nylon-based fabrics, preferred are nylon fabrics are available in a range of deniers and weights, ranging from low denier ripstop fabrics (approximately 30-100 denier) to high denier fabrics (approximately 400-1500 denier), with fabrics formed from nylon fibers having a denier of from 400 to 2000 denier being particularly preferred, more preferably from about 500 to about 1500 denier, and most preferably from about 500 to about 1000 denier.

In still other embodiments, the non-woven grid fabric may be laminated to a breathable foam. Suitable breathable foams non-exclusively include CoTran™ foams commercially available from 3M Company of Maplewood, Minn., USA, including CoTran™ polyurethane and polyethylene foams, as well as the foams described in U.S. Pat. No. 7,083,849, which is incorporated herein by reference to the extent consistent herewith. In still other embodiments, the non-woven grid fabric may be laminated to other woven or non-woven fabrics, whether breathable or not breathable, to form a multilayer composite article. In still other embodiments, the non-woven grid fabric may be laminated to a plurality of substrates, including combinations of films, membranes and fabrics, most preferably where the grid is incorporated as a central layer between two substrates. In a preferred multilayer composite article, a fabric (breathable or not-breathable, water-resistant or not water-resistant) is attached to one side of the grid and a breathable membrane is attached to another side of the grid, positioning the grid in the middle of the three-layer structure. In another preferred embodiment, a multilayer composite article is formed comprising a fabric having an outside surface coated with a durable water repellent, which is attached to a first surface of a grid structure, followed by water proof membrane/film (breathable or not) attached to the second surface of the grid structure.

Preferred substrates attached to the grid structures of this disclosure are preferably thin, having preferred layer thicknesses of from about 1 µm to about 250 µm, more preferably from about 5 µm to about 25 µm and most preferably from about 5 µm to about 9 µm. While such thicknesses are preferred, it is to be understood that other thicknesses may be produced to satisfy a particular need and yet fall within the scope of the present invention.

To maximize strength, lightweight, and in some embodiments breathability, it may be preferred to laminate one or more of the substrates to the open, non-woven fabric via an intermediate, discontinuous adhesive, such as a discontinuous adhesive web, discontinuous adhesive scrim or via an adhesive dot matrix positioned between substrate and the grid. Such a discontinuous adhesive is particularly preferred for adhering a fabric (e.g., woven, knit and/or non-woven fabric) to the grid. In this regard, "discontinuous" means that the adhesive is not a continuous film/layer that covers the entire or substantially all of the substrate surface. Suitable adhesive webs or adhesive scrims non-exclusively include discontinuous thermoplastic webs, ordered discontinuous thermoplastic nets, non-woven discontinuous adhesive fabrics and non-woven discontinuous adhesive scrims. Most preferred adhesive webs/scrims are heat-activated, non-woven adhesive webs such as SPUNFAB®, commercially available from Spunfab, Ltd, of Cuyahoga Falls, Ohio (trademark registered to Keuchel Associates, Inc.). Also suitable are THERMOPLAST™ and HELIOPLAST™ webs, nets and films, commercially available from Protechnic S.A. of Cernay, France. Of all the above, most preferred is a polyamide web, particularly SPUNFAB® polyamide webs. SPUNFAB® polyamide webs have a melting point of typically from about 75° C. to about 200° C., but this is not limiting. Also suitable are other forms of discontinuous (non-continuous) adhesives, such as the application of a discontinuous domain matrix such as described in U.S. Pat. No. 6,846,548 or the application of a plurality of adhesive dots/droplets as noted above, such as hot melt adhesive dots/droplets, such as described for example in U.S. Pat. Nos. 4,911,956 and 5,160,686.

Figure 3:
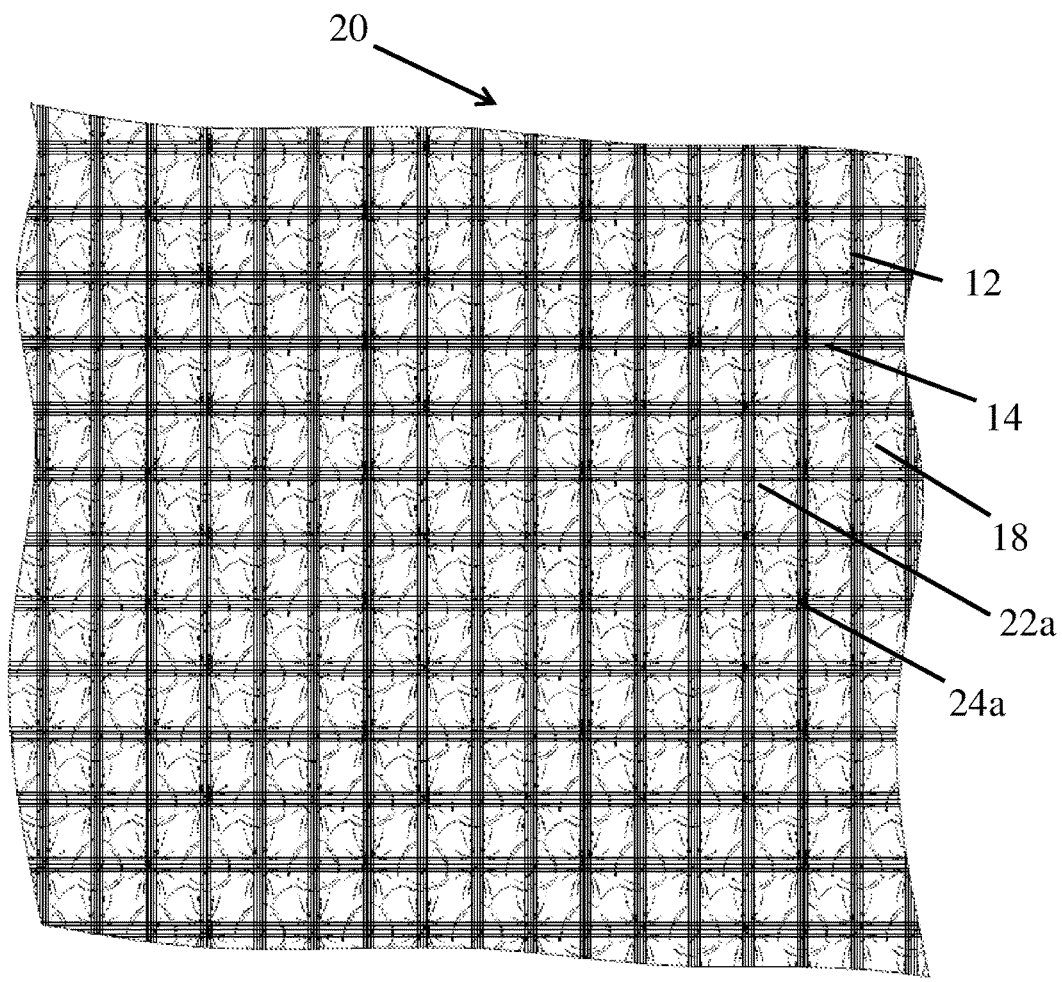
FIG. 3 is a front perspective view schematic representation of a composite having a grid fabric structure as illustrated in FIG. 1 laminated to a substrate, resulting in the formation of rounded protrusions and sunken dimples.

As illustrated in FIGS. 3-12, it has been unexpectedly found that upon laminating an open, non-woven fabric (i.e., grid fabric structure) of this disclosure with a substrate that comprises a polymer film/membrane (breathable or not breathable) and/or with a substrate that comprises a fabric, a uniquely textured fabric (is achieved having raised areas and depressed areas. As illustrated in FIG. 3, first elongate bodies 12 of a first array and second elongate bodies 14 of a second array are shown as combined with a substrate 18 to form a composite 20. The substrate 18 may be, for example, clear (e.g., a colorless film), transparent but colored (e.g., a transparent colored film), semi-transparent (including semi-transparent fabrics as well as films), translucent (including fabrics and polymeric films) or opaque (also including fabrics or polymeric films), which substrate covers the bodies as well as covers the gaps between the adjoined bodies, which gaps are open and unfilled prior to attachment of the substrate(s). The substrate may also be colored for improving the aesthetic appearance of the composite. The tension in the bonded bodies 12 and 14, combined with their spacing and the absence of resin in the gaps, causes the formation of raised, outward extending protruding from a first (front) surface of the composite and, in some embodiments, sunken, inward extending depressions (dimpled areas) extending below the front surface of the composite. As shown in FIGS. 3-7, in one embodiment, both the first (front) surface of composite 20 and the second (rear) surface of the composite may each include both outward extending protrusions 22a and inward extending depressions 24a. In other embodiments, such as illustrated in FIGS. 8-12, only one surface will have outward extending protrusions. As illustrated in FIGS. 8-12, composite 40 has outward extending protrusions 44a extend from a first, front surface, while corresponding inward extending depressions 44b (dimpled areas) extend inward from the second, rear surface. As noted in FIGS. 3-12, in some embodiments the protrusions have a rounded shape (which are illustrated in FIGS. 3-7 as having protrusions from both surfaces), while in other embodiments the protrusions have a rectangular shape (which are illustrated in FIGS. 8-12 as having protrusions from only the first surface). The shape and location of the bumps is determined by a relationship of the grid structure to the attached substrates. Stiffer substrates (e.g., relatively heavier and thicker substrates, such as heavy fabrics), for example having a thickness of about 100 µm (0.0039 inch) or greater, typically from 100 µm to 152.4 µm (0.006 inch)) tend to create the rounded protrusions on both surfaces, while more flexible substrates (e.g., having a thickness of less than about 80 µm), typically from 10 µm to about 80 µm, or more typically from 25.4 µm (0.001 inch) to 76.2 µm (0.003 inch) such as thin polymer films or light weight fabrics) tend to create the rectangular protrusions, particularly when the spacing between elongate bodies in the grid structure is greater than ¼ inch. It has also been recognized that composites comprising a fabric attached to one surface (e.g., first surface) of the grid structure and a polymeric film or membrane on the other surface (e.g., second surface) of the grid structure increases stiffness and results in rounded protrusion formation rather than rectangular protrusions, particularly when the spacing between elongate bodies in the grid structure is ¼ inch or less.

Figure 4:
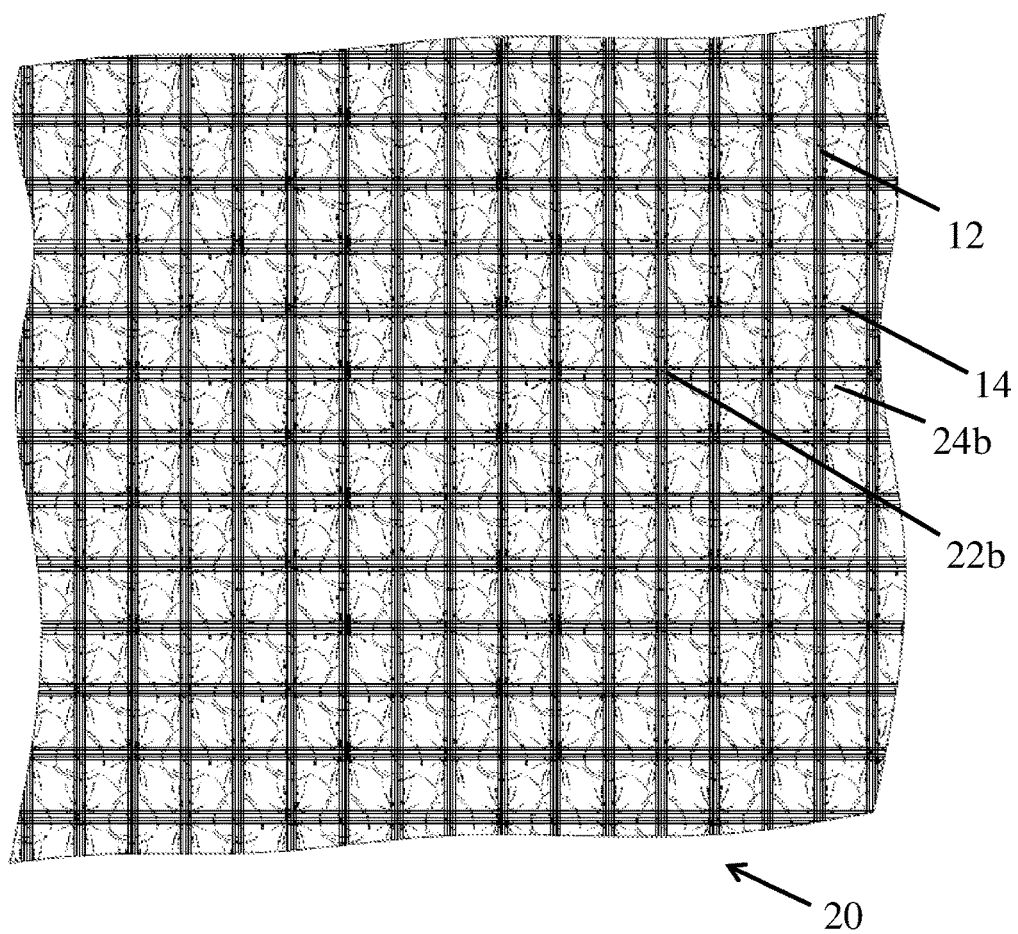
FIG. 4 is a rear-view schematic representation of the rear surface of the composite illustrated in FIG. 3, showing rounded protrusions and sunken dimples corresponding to the sunken dimples and rounded protrusions, respectively, on the front surface.
Figure 5:
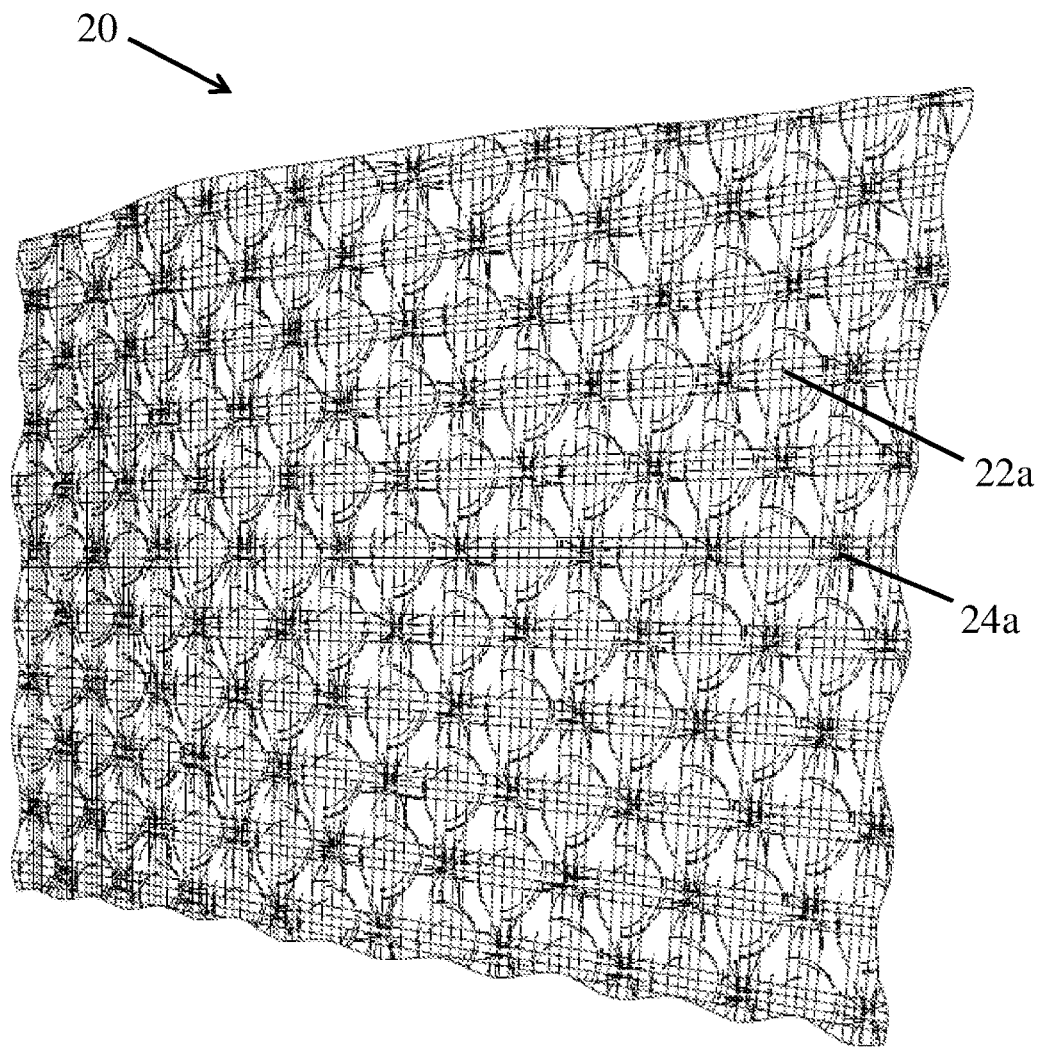
FIG. 5 is a perspective view schematic representation of the composite illustrated in FIG. 3.

As illustrated in FIG. 4, the rear surface of composite 20 has outward extending protrusions 24b and inward extending depressions 22b wherein the rear protrusions correspond to the opposite side of front depressions 24a and wherein the rear depressions correspond to the opposite side of front protrusions 22a. This textured surface gives composites formed incorporating the open, non-woven fabrics an attractive appearance that may be desirable for a wide range of end use applications ranging from garments to other commercial and industrial fabrics. In most embodiments, the grid fabric 10 will be visible from at least one of the first and second surfaces of a multilayer composite, adding to the attractiveness of the composite appearance.

Figure 6:
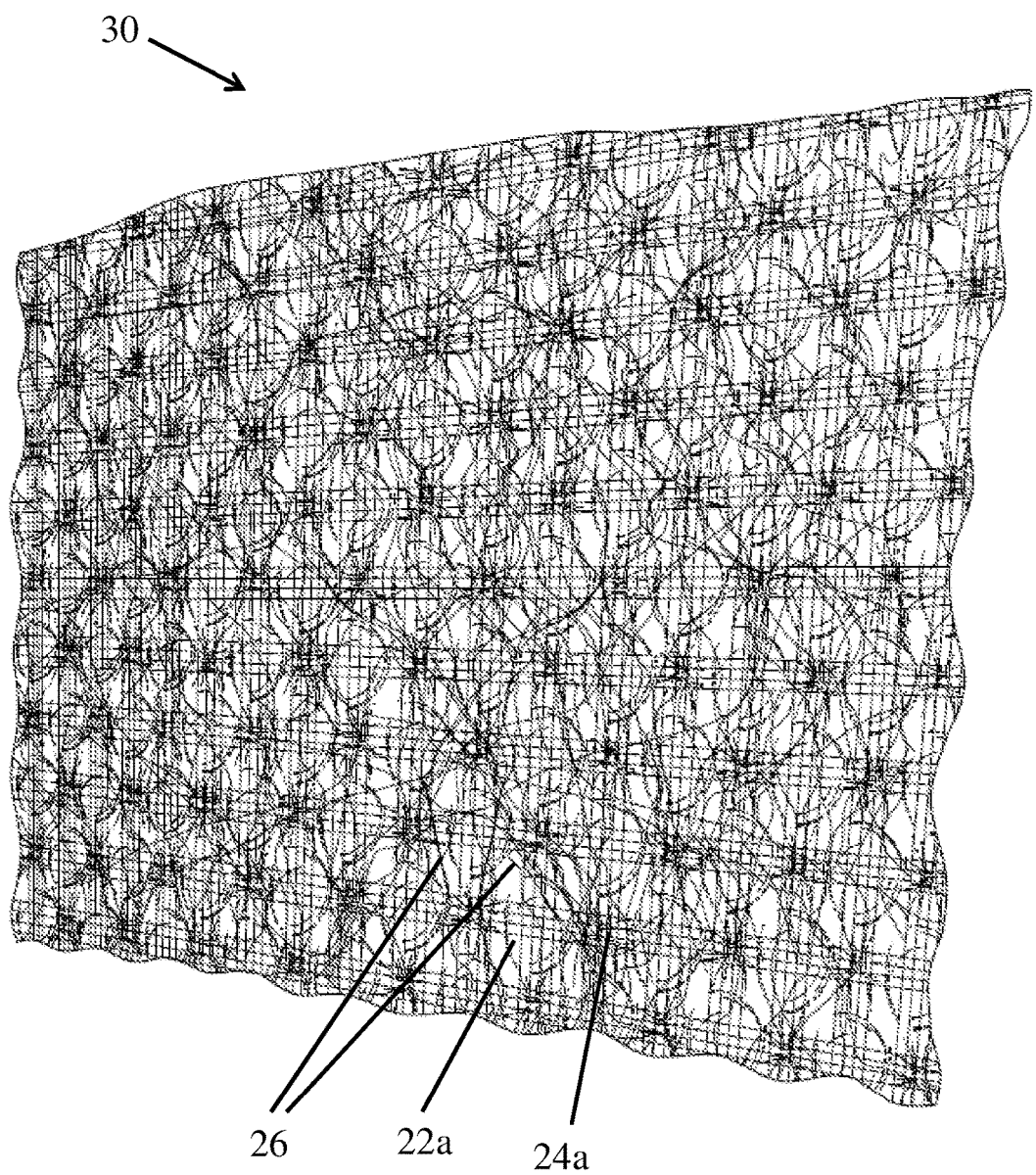
FIG. 6 is a front perspective view schematic representation of a composite having a grid fabric structure as illustrated in FIG. 1 laminated to a substrate, resulting in the formation of rounded protrusions and sunken dimples, wherein the substrate is bonded to the grid fabric structure via an intermediate adhesive scrim positioned between the grid fabric and the substrate.
Figure 7:
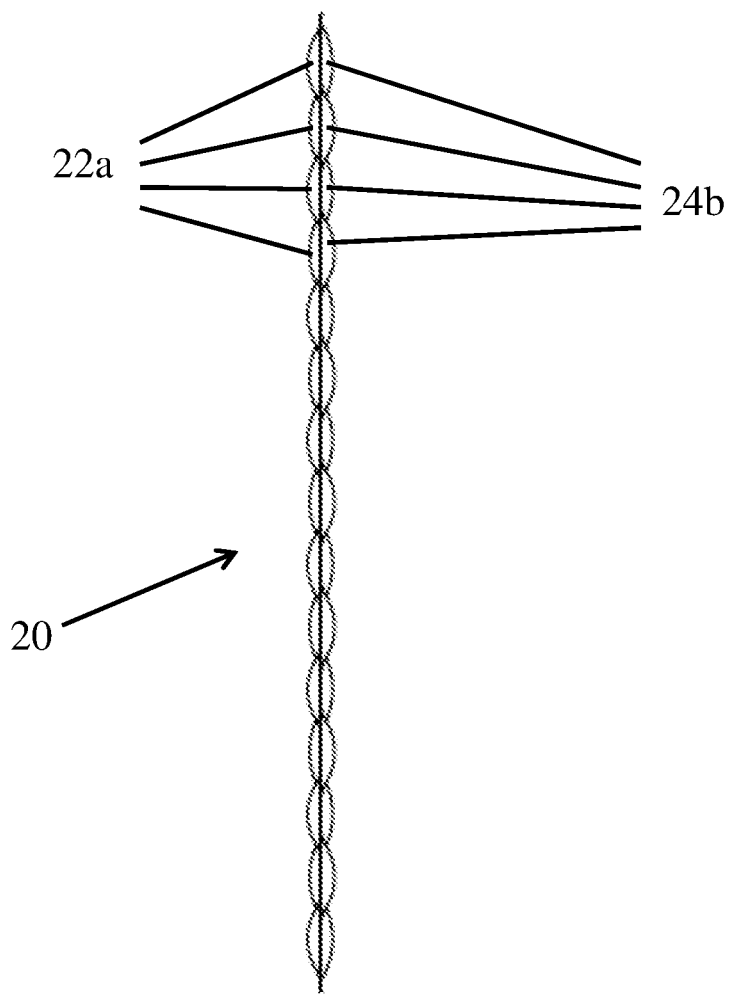
FIG. 7 is a side perspective view schematic representation of a composite as illustrated in FIGS. 3-6.
Figure 8:
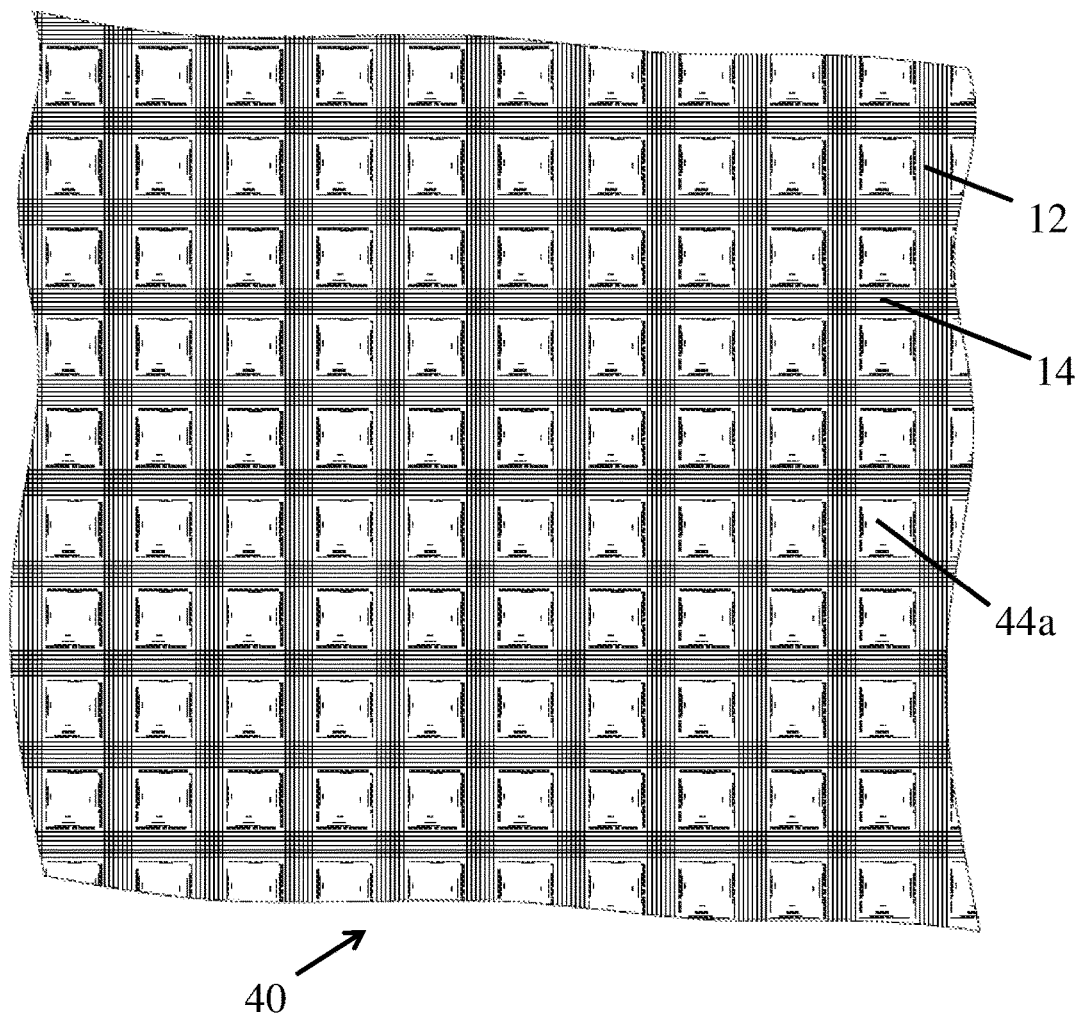
FIG. 8 is a front perspective view schematic representation of a composite having a grid fabric structure as illustrated in FIG. 1 laminated to a polymeric substrate, resulting in the formation of rectangular protrusions.
Figure 9:
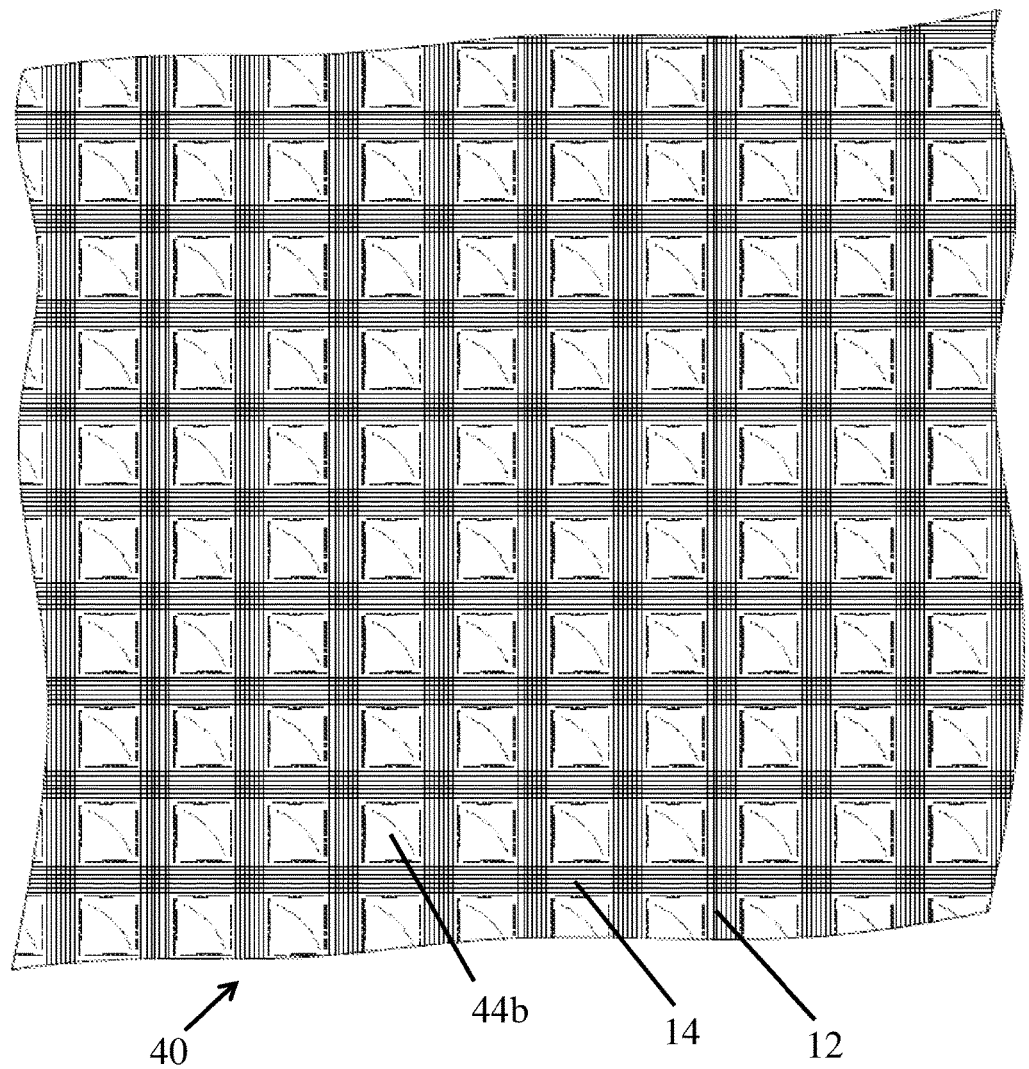
FIG. 9 is a rear-view schematic representation of the rear surface of the composite illustrated in FIG. 8, showing sunken rectangular dimples corresponding to the rectangular protrusions on the front surface.
Figure 10:
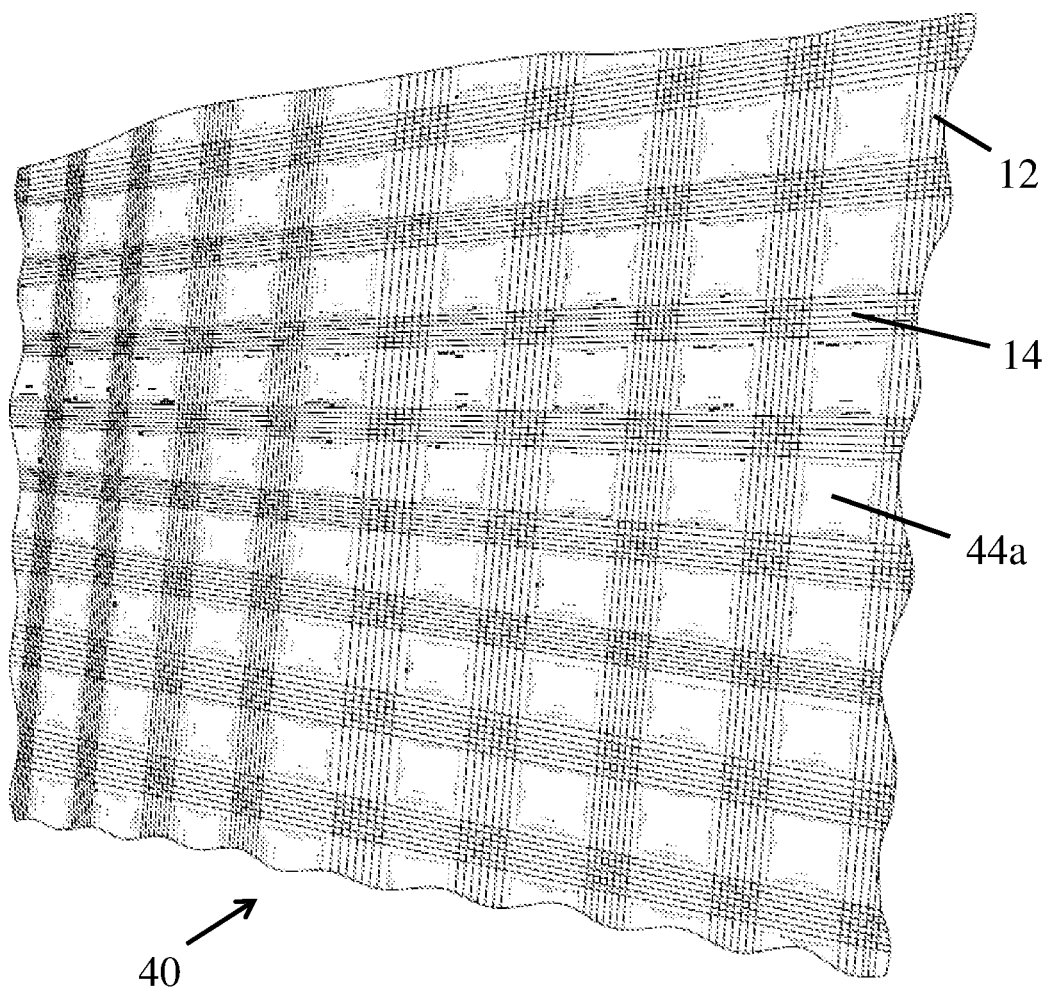
FIG. 10 is a perspective view schematic representation of the composite illustrated in FIG. 8.

The appearance of a composite article may also be affected by the appearance of intermediate adhesives, such as an intermediate adhesive scrim positioned between the open, non-woven fabric one or more attached substrates. For example, as illustrated in FIG. 6, a composite 30 is shown that incorporates a scrim 26 as an intermediate layer positioned between a substrate and an open, non-woven fabric. As illustrated in FIG. 11, a composite 50 is shown that incorporates a similar scrim 46. The appearance of scrims 26/46 as illustrated contrasts with the appearance of the elongate bodies 12 and 14, but the color of the scrim is not intended to be limiting.

By virtue of the unexpectedly unique appearance, the composites of this disclosure are particularly desirable for use in textile industries that fabricate wearable articles such as sports apparel and footwear, as well as non-wearable textile articles such as tents, where properties such as environmental resistance and breathability are equally as important as high strength and light weight, and also with a more attractive and marketable appearance than any other known fibrous composites. By varying the colors of the attached substrates relative to the grid fabric particularly aesthetically pleasing multi-color fiber arrangements may be fabricated for apparel, footwear, sporting goods and tactical products, etc. The multiple colors can stimulate customer interest and introduces them to the inherent benefits of high tenacity fibers (e.g., high tenacity, high modulus polyethylene (HMPE)), including high tensile strength, high tear strength, potential abrasion resistance and low weight, as well as in cooling benefits, improved dry time and reduced pilling in some applications. Aesthetically pleasing appearances may also be achieved, for example, by varying the colors of the elongate bodies forming the grid fabric (e.g., combining white UHMWPE fiber or colored HMPE fiber with one or more colored HMPE fibers, or even varying the filament colors within the elongate bodies themselves), with the elongate bodies being of any deniers and spacing increments, and also optionally with the elongate bodies being aligned at angles to create a multi-axial plaid appearance. Furthermore, as noted above, composite surfaces having a puckered, bumpy surface due to the surface protrusions is also aesthetically pleasing, while also satisfying the functional needs of the end user. Finally, as illustrated in FIGS. 3-6 and 8-11, in some composite structures where the substrate is a lightweight, translucent fabric, and/or when the elongate bodies of the grid are darker in color than the substrate, the grid material will show through the fabric causing another pleasing visual effect.

The following examples serve to illustrate preferred embodiments of the disclosure:

EXAMPLE 1

A grid material was produced using 504 ends of 200 denier SPECTRA® S-1000 ultra-high molecular weight polyethylene fiber having a tenacity of 38.0 g/denier and a tensile modulus of 1158 g/denier whereby 3 multi-filament fibers (having 82 filaments) were combined and inserted into one space of a heddle, thereby forming a side-by-side, unidirectional array having 168 individual, spaced apart bundles of fiber. The fibers were spaced about 0.381 inches apart from one another on center. After collimating the fibers, the fibers were coated with a thermoplastic polyurethane water based coating. After coating the fibers were placed on a silicone paper substrate and dried such that the unidirectional array of coated fibers adhered lightly to the paper and maintained their spatial array positions during subsequent handling. The array was then cross-plied at 90° to one another identical array to form a grid-like structure with 68% by weight fiber content and 32% by weight of the polyurethane resin content. The total areal density of the grid material was 20.33 g/m$^2$ when the resin was dried and the grid removed from the silicone paper substrate. The grid material was then laminated to a red face fabric having an areal density of about 68 g/m$^2$ via an intermediate polyurethane adhesive scrim material having an areal density of about 14 g/m$^2$ to form a composite laminate. The total areal density of the composite laminate was about 102 g/m$^2$. The maximum tensile load of a 1 inch wide strip of the red nylon fabric was 64.41 lbs. and had a tensile strain of 52.73% in the warp direction. The maximum tensile load of a 1 inch wide strip of the composite laminate was 121.56 lbs. and had a tensile strain of 4.85% in the warp direction.

EXAMPLE 2

Example 1 was repeated except the grid material was laminated to a grey face fabric having an areal density of about 22 g/m$^2$ via an intermediate polyamide adhesive scrim material having an areal density of about 8 g/m$^2$ to form a composite laminate. The total areal density of the composite laminate was about 48 g/m$^2$. The maximum tensile load of a 1 inch wide strip of the grey nylon fabric was 17.58 lbs. and had a tensile strain of 37.3% in the warp direction. The maximum tensile load of a 1 inch wide strip of the composite laminate was 134.33 lbs. and had a tensile strain of 5.43% in the warp direction. Also, in trapezoid tear testing of the composite laminate the maximum load in the warp direction was 6.2 lbs. while the maximum load in the warp direction of the laminate was 31.4 lbs.

EXAMPLE 3

A grid material was produced using 268 ends of 375 denier SPECTRA® S-1000 ultra-high molecular weight polyethylene fiber having a tenacity of 35.0 g/denier and a tensile modulus of 1200 g/denier whereby 1 multi-filament fiber (having 60 filaments) was inserted into one space of a heddle, thereby forming a side-by-side, unidirectional array having 268 individual, spaced apart bundles of fiber. The fibers were spaced about 0.239 inches apart from one another on center. After collimating the fibers, the fibers were coated with a thermoplastic polyurethane water based coating. After coating the fibers were placed on a silicone paper substrate and dried such that the unidirectional array of coated fibers adhered lightly to the paper and maintained their spatial array positions during subsequent handling. The array was then cross-plied at 90° to one another identical array to form a grid-like structure with 69.86% by weight fiber content and 30.14% by weight of the polyurethane resin content. The total areal density of the grid material was 19.675 g/m$^2$ when the resin was dried and the grid removed from the silicone paper substrate. The grid material was then laminated to a red Chamatex nylon face fabric (commercially available from Chamatex SA of Ardoix, France) having an areal density of about 36.5 g/m$^2$ via an intermediate polyamide adhesive scrim material of about 6 g/m$^2$ to form a composite laminate. The total areal density of the composite laminate was about 62.2 g/m$^2$. The maximum tensile load of a 1 inch wide strip of the red Chamatex nylon fabric was 46.35 lbs. and had a tensile strain of 42.77% in the warp direction. The maximum tensile load of a 1 inch wide strip of the composite laminate was 95.06 lbs. and had a tensile strain of 4.96% in the warp direction. Also, in trapezoid tear testing of the red Chamatex nylon fabric the maximum load in the warp direction was 12.0 lbs. while the maximum load in the warp direction of the composite laminate was 41.6 lbs. Also, in trapezoid tear testing of the red Chamatex nylon fabric the maximum load in the fill direction was 4.7 lbs. while the maximum load in the warp direction of the composite laminate was 32.5 lbs.

While the present disclosure has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiment, those alternatives which have been discussed above and all equivalents thereto.

What is claimed is:

1. An open, non-woven fabric comprising:
   a) a first array comprising a plurality of laterally spaced first elongate bodies, wherein immediately laterally adjacent first elongate bodies are spaced apart from each other at their nearest longitudinal edges whereby an empty space is between said immediately laterally adjacent first elongate bodies; wherein each of said first elongate bodies comprises at least one filament and comprises a polymeric binder material coating, said polymeric binder material coating comprising less than 50% by weight of each of said first elongate bodies, and wherein at least about 75% of the surface area of each of the first elongate bodies is covered with the polymeric binder material;
   b) a second array comprising a plurality of laterally spaced second elongate bodies, wherein immediately laterally adjacent second elongate bodies are spaced apart from each other at their nearest longitudinal edges whereby an empty space is between said immediately laterally adjacent second elongate bodies; wherein each of said second elongate bodies comprises at least one filament and comprises a polymeric binder material coating, said polymeric binder material coating comprising less than 50% by weight of each of said second elongate bodies, and wherein at least about 75% of the surface area of each of the second elongate bodies is covered with the polymeric binder material;
   wherein the first array overlies the second array and wherein the first elongate bodies are oriented at an angle relative to the second elongate bodies, whereby gaps are defined at junctions of pairs of overlying, adjacent first elongate bodies and pairs of underlying, adjacent second elongate bodies;
   wherein each of the first elongate bodies overlies and is bonded to a plurality of the second elongate bodies, and wherein each of the second elongate bodies underlies and is bonded to a plurality of the first elongate bodies, whereby the first elongate bodies and the second elongate bodies are bonded to each other at their junctions.

2. The open, non-woven fabric of claim 1 wherein said first elongate bodies and said second elongate bodies each comprise high tenacity elongate bodies having a tenacity of at least about 14 g/denier and a tensile modulus of at least about 300 g/denier.

3. The open, non-woven fabric of claim 1 wherein said first elongate bodies of said first array are unidirectionally oriented and wherein said second elongate bodies of said second array are unidirectionally oriented, wherein said adjacent first elongate bodies are spaced apart from each other at their nearest longitudinal edges by at least about 1/16 inch and wherein said adjacent second elongate bodies are spaced apart from each other at their nearest longitudinal edges by at least about 1/16 inch.

4. The open, non-woven fabric of claim 3 wherein said adjacent first elongate bodies are spaced apart from each other at their nearest longitudinal edges by at least about 1/16 inch to about 1/12 inch and wherein said adjacent second elongate bodies are spaced apart from each other at their nearest longitudinal edges by at least about 1/16 inch to about 1/12 inch.

5. The open, non-woven fabric of claim 1 wherein all of the surface area of all of said first and second elongate bodies is coated with said binder coating.

6. The open, non-woven fabric of claim 5 wherein said resin comprises a polyurethane.

7. The open, non-woven fabric of claim 1 wherein said first and second elongate bodies each comprise multifilament tapes, each multifilament tape comprising a compressed and flattened fiber.

8. The open, non-woven fabric of claim 1 wherein said first and second elongate bodies each comprise multifilament fibers.

9. The open, non-woven fabric of claim 1 wherein said first and second elongate bodies comprise a combination of multifilament polyethylene tapes and multifilament polyethylene fibers, wherein each tape comprises a compressed and flattened polyethylene fiber and wherein each fiber comprises a bundle of filaments.

10. The open, non-woven fabric of claim 1 wherein the first array and the second array bonded together form a first layer, wherein said non-woven fabric further comprises a second layer, said first layer having a composition and construction and said second layer having a composition and construction, wherein the composition and construction of said second layer are the same as the composition and construction of the first layer, and wherein said first layer and said second layer are bonded together.

11. The open, non-woven fabric of claim 1 wherein the first array and the second array are substantially the same, wherein the elongate bodies forming the first array and the elongate bodies forming the second array all comprise the same fiber/tape type, have substantially the same dimensions, and have substantially the same spacing between adjacent elongate bodies.

12. The open, non-woven fabric of claim 1 wherein the first array and the second array are different, wherein the elongate bodies forming the first array have different deniers than the elongate bodies forming the second array.

13. The open, non-woven fabric of claim 1 wherein the first array and the second array are different, wherein the spacing between adjacent elongate bodies of the first array is different than the spacing between adjacent elongate bodies of the second array.

14. The open, non-woven fabric of claim 1 wherein each of said first elongate bodies and said second elongate bodies has a denier of from about 100 to about 800.

15. The open, non-woven fabric of claim 1 wherein the fabric has a total areal density of from about 6 grams/m$^2$ to about 50 grams/m$^2$.

16. The open, non-woven fabric of claim 1 wherein said gaps are open.

17. The open, non-woven fabric of claim 5 wherein said gaps are open.

18. The open, non-woven fabric of claim 1 wherein at least about 85% of the surface area of each of the first elongate bodies is covered with the polymeric binder material and wherein at least about 85% of the surface area of each of the second elongate bodies is covered with the polymeric binder material.

19. The open, non-woven fabric of claim 1 wherein at least about 95% of the surface area of each of the first elongate bodies is covered with the polymeric binder material and wherein at least about 95% of the surface area of each of the second elongate bodies is covered with the polymeric binder material.

* * * * *